(12) United States Patent
Duportal et al.

(10) Patent No.: US 8,763,267 B2
(45) Date of Patent: Jul. 1, 2014

(54) LOCKING COUNTERBALANCE FOR A CMM

(75) Inventors: Thibault Duportal, Prunay-Cassereau (FR); Paul Ferrari, Carlsbad, CA (US); Jean-Luc Famechon, Villerable (FR); Wes Inglis, Vista, CA (US)

(73) Assignee: Hexagon Technology Center GmbH, Heerbrugg (CH)

( * ) Notice: Subject to any disclaimer, the term of this patent is extended or adjusted under 35 U.S.C. 154(b) by 135 days.

(21) Appl. No.: 13/355,394

(22) Filed: Jan. 20, 2012

(65) Prior Publication Data

US 2013/0187022 A1 Jul. 25, 2013

(51) Int. Cl.
*G01B 5/008* (2006.01)

(52) U.S. Cl.
USPC .......................................................... 33/503

(58) Field of Classification Search
USPC .................................................. 33/503, 556
See application file for complete search history.

(56) References Cited

U.S. PATENT DOCUMENTS

| | | | |
|---|---|---|---|
| 3,818,596 A * | 6/1974 | Stemple et al. | ................. 33/503 |
| 4,492,036 A | 1/1985 | Beckwith | |
| 4,592,697 A | 6/1986 | Tuda et al. | |
| 4,838,696 A | 6/1989 | Pryor | |
| 4,843,904 A | 7/1989 | Moore | |
| 4,888,877 A | 12/1989 | Enderle et al. | |
| 4,972,090 A | 11/1990 | Eaton | |
| 5,008,555 A | 4/1991 | Mundy | |
| 5,084,981 A | 2/1992 | McMurtry et al. | |
| 5,088,337 A | 2/1992 | Bennett | |
| 5,129,044 A | 7/1992 | Kashiwagi et al. | |
| 5,148,377 A | 9/1992 | McDonald | |
| 5,187,874 A | 2/1993 | Takahashi et al. | |
| 5,189,797 A | 3/1993 | Granger | |
| 5,251,156 A | 10/1993 | Heier et al. | |
| 5,332,895 A | 7/1994 | Rieder | |
| 5,396,712 A | 3/1995 | Herzog | |
| 5,408,754 A | 4/1995 | Raab | |
| 5,412,880 A | 5/1995 | Raab | |
| 5,505,003 A | 4/1996 | Evans et al. | |
| 5,510,977 A | 4/1996 | Raab | |

(Continued)

FOREIGN PATENT DOCUMENTS

| | | |
|---|---|---|
| DE | 3204885 | 2/1983 |
| DE | 4345091 | 7/1995 |

(Continued)

OTHER PUBLICATIONS

Takao Horie, et al, Remote Force Control of Robot Using PHANToM Haptic Model and Force Sensor, Proceedings of the 4th IEEE, May 28-29, 2001, pp. 128-135, Fukuoka, Japan.

(Continued)

*Primary Examiner* — G. Bradley Bennett
(74) *Attorney, Agent, or Firm* — Knobbe Martens Olson & Bear LLP

(57) ABSTRACT

An articulated arm CMM comprises a plurality of transfer members, a plurality of articulation members connecting at least two transfer members to each other, a coordinate acquisition member at a distal end, and a base at a proximal end. The articulated arm CMM also comprises (1) a ratchet lock for restricting the motion of at least one transfer member in at least one direction of rotation and (2) a clutch mechanism for allowing limited rotation of the at least one transfer member upon application of a high amount of force upon at least one transfer member.

53 Claims, 20 Drawing Sheets

(56) References Cited

U.S. PATENT DOCUMENTS

| | | | |
|---|---|---|---|
| 5,521,847 A | 5/1996 | Ostrowski et al. | |
| 5,526,576 A | 6/1996 | Fuchs et al. | |
| 5,528,505 A | 6/1996 | Granger et al. | |
| 5,611,147 A | 3/1997 | Raab | |
| 5,615,489 A | 4/1997 | Breyer et al. | |
| 5,757,499 A | 5/1998 | Eaton | |
| 5,768,792 A | 6/1998 | Raab | |
| 5,794,356 A | 8/1998 | Raab | |
| 5,822,450 A | 10/1998 | Arakawa et al. | |
| 5,829,148 A | 11/1998 | Eaton | |
| 5,978,748 A | 11/1999 | Raab | |
| 5,991,704 A | 11/1999 | Rekar et al. | |
| 6,015,473 A | 1/2000 | Rosenberg et al. | |
| 6,131,299 A | 10/2000 | Raab et al. | |
| 6,134,506 A | 10/2000 | Rosenberg et al. | |
| 6,151,789 A | 11/2000 | Raab | |
| 6,161,079 A | 12/2000 | Zink et al. | |
| 6,166,811 A | 12/2000 | Long et al. | |
| 6,219,928 B1 | 4/2001 | Raab et al. | |
| 6,253,458 B1 | 7/2001 | Raab et al. | |
| 6,366,831 B1 | 4/2002 | Raab | |
| 6,430,828 B1 | 8/2002 | Ulbrich | |
| 6,487,896 B1 | 12/2002 | Dall'Aglio | |
| 6,526,670 B1 | 3/2003 | Carli | |
| 6,598,306 B2 | 7/2003 | Eaton | |
| 6,611,346 B2 | 8/2003 | Granger | |
| 6,611,617 B1 | 8/2003 | Crampton | |
| 6,618,496 B1 | 9/2003 | Tassakos et al. | |
| 6,668,466 B1 | 12/2003 | Bieg et al. | |
| 6,676,363 B1 | 1/2004 | Solignac | |
| 6,759,648 B2 | 7/2004 | Baxter et al. | |
| 6,817,108 B2 | 11/2004 | Eaton | |
| 6,892,465 B2 | 5/2005 | Raab et al. | |
| 6,904,691 B2 | 6/2005 | Raab et al. | |
| 6,925,722 B2 | 8/2005 | Raab et al. | |
| 6,931,745 B2 | 8/2005 | Granger | |
| 6,952,882 B2 | 10/2005 | Raab et al. | |
| 6,973,734 B2 | 12/2005 | Raab et al. | |
| 6,984,236 B2 | 1/2006 | Raab | |
| 6,988,322 B2 | 1/2006 | Raab et al. | |
| 7,003,892 B2 | 2/2006 | Eaton et al. | |
| 7,017,275 B2 | 3/2006 | Raab et al. | |
| 7,043,847 B2 | 5/2006 | Raab et al. | |
| 7,051,447 B2 | 5/2006 | Kikuchi et al. | |
| 7,051,450 B2 | 5/2006 | Raab et al. | |
| 7,069,664 B2 | 7/2006 | Raab et al. | |
| 7,073,271 B2 | 7/2006 | Raab et al. | |
| 7,096,077 B2 | 8/2006 | Price et al. | |
| 7,152,456 B2 | 12/2006 | Eaton | |
| 7,174,651 B2 | 2/2007 | Raab et al. | |
| 7,269,910 B2 | 9/2007 | Raab et al. | |
| 7,296,364 B2 | 11/2007 | Seitz et al. | |
| 7,296,979 B2 | 11/2007 | Raab et al. | |
| 7,372,581 B2 | 5/2008 | Raab et al. | |
| 7,395,606 B2 | 7/2008 | Crampton | |
| 7,441,341 B2 | 10/2008 | Eaton | |
| 7,525,276 B2 | 4/2009 | Eaton | |
| 7,546,689 B2 | 6/2009 | Ferrari et al. | |
| 7,568,293 B2 | 8/2009 | Ferrari | |
| 7,578,069 B2 | 8/2009 | Eaton | |
| D599,226 S | 9/2009 | Gerent et al. | |
| 7,591,078 B2 | 9/2009 | Crampton | |
| 7,614,157 B2 | 11/2009 | Granger | |
| 7,624,510 B2 | 12/2009 | Ferrari | |
| 7,640,674 B2 | 1/2010 | Ferrari et al. | |
| 7,676,945 B2 | 3/2010 | Prestidge et al. | |
| 7,693,325 B2 | 4/2010 | Pulla et al. | |
| 7,735,234 B2 | 6/2010 | Briggs et al. | |
| 7,743,524 B2 | 6/2010 | Eaton et al. | |
| 7,774,949 B2 | 8/2010 | Ferrari | |
| 7,779,548 B2 | 8/2010 | Ferrari | |
| 7,784,194 B2 | 8/2010 | Raab et al. | |
| 7,797,849 B2 | 9/2010 | Gomez et al. | |
| 7,805,854 B2 | 10/2010 | Eaton | |
| 7,908,757 B2 | 3/2011 | Ferrari | |
| 7,984,558 B2 | 7/2011 | Ferrari | |
| D643,319 S | 8/2011 | Ferrari et al. | |
| 8,001,697 B2 | 8/2011 | Danielson et al. | |
| 8,015,721 B2 | 9/2011 | Eaton et al. | |
| 8,082,673 B2 | 12/2011 | Desforges et al. | |
| 8,099,877 B2 | 1/2012 | Champ | |
| 8,104,189 B2 | 1/2012 | Tait | |
| 8,112,896 B2 | 2/2012 | Ferrari et al. | |
| 8,122,610 B2 | 2/2012 | Tait et al. | |
| 8,123,350 B2 | 2/2012 | Cannell et al. | |
| 8,127,458 B1 | 3/2012 | Ferrari | |
| 8,145,446 B2 | 3/2012 | Atwell et al. | |
| 8,151,477 B2 | 4/2012 | Tait | |
| 8,176,646 B2 | 5/2012 | Ferrari | |
| 8,201,341 B2 | 6/2012 | Ferrari | |
| 8,220,173 B2 | 7/2012 | Tait | |
| 8,229,208 B2 | 7/2012 | Pulla et al. | |
| 8,327,555 B2 | 12/2012 | Champ | |
| 8,336,220 B2 | 12/2012 | Eaton et al. | |
| 8,402,669 B2 | 3/2013 | Ferrari et al. | |
| 8,429,828 B2 | 4/2013 | Ferrari | |
| 8,497,901 B2 | 7/2013 | Pettersson | |
| 2002/0087233 A1 | 7/2002 | Raab | |
| 2005/0166413 A1* | 8/2005 | Crampton | 33/503 |
| 2008/0016711 A1 | 1/2008 | Baebler | |
| 2009/0000136 A1 | 1/2009 | Crampton | |
| 2009/0083985 A1 | 4/2009 | Ferrari | |
| 2009/0106994 A1 | 4/2009 | Gomez | |
| 2010/0180709 A1 | 7/2010 | Choi et al. | |
| 2011/0107612 A1 | 5/2011 | Ferrari et al. | |
| 2011/0112786 A1 | 5/2011 | Desforges et al. | |
| 2011/0175745 A1 | 7/2011 | Atwell et al. | |
| 2011/0192043 A1* | 8/2011 | Ferrari | 33/503 |
| 2011/0213247 A1 | 9/2011 | Shammas | |
| 2012/0210590 A1* | 8/2012 | Ferrari | 33/503 |
| 2013/0047452 A1* | 2/2013 | McMurtry et al. | 33/503 |
| 2013/0129406 A1 | 5/2013 | Duportal et al. | |
| 2013/0239424 A1* | 9/2013 | Tait | 33/503 |

FOREIGN PATENT DOCUMENTS

| | | |
|---|---|---|
| DE | 19945189 | 4/2001 |
| DE | 10112977 | 11/2002 |
| EP | 0266070 | 5/1988 |
| EP | 0522610 | 1/1993 |
| EP | 0591550 | 4/1994 |
| EP | 2108917 | 10/2009 |
| FR | 2740546 | 4/1997 |
| GB | 2274526 | 7/1994 |
| JP | 05/031685 | 2/1993 |
| JP | 2003/021133 | 1/2003 |
| JP | 2003/175484 | 6/2003 |
| WO | WO 93/05479 | 3/1993 |
| WO | WO 98/08050 | 2/1998 |
| WO | WO 01/63202 | 2/2001 |
| WO | WO 2007/039278 | 4/2007 |

OTHER PUBLICATIONS

PCT International Search Report from corresponding PCT Application No. PCT/IB2013/000469, dated Jun. 11, 2013.

* cited by examiner

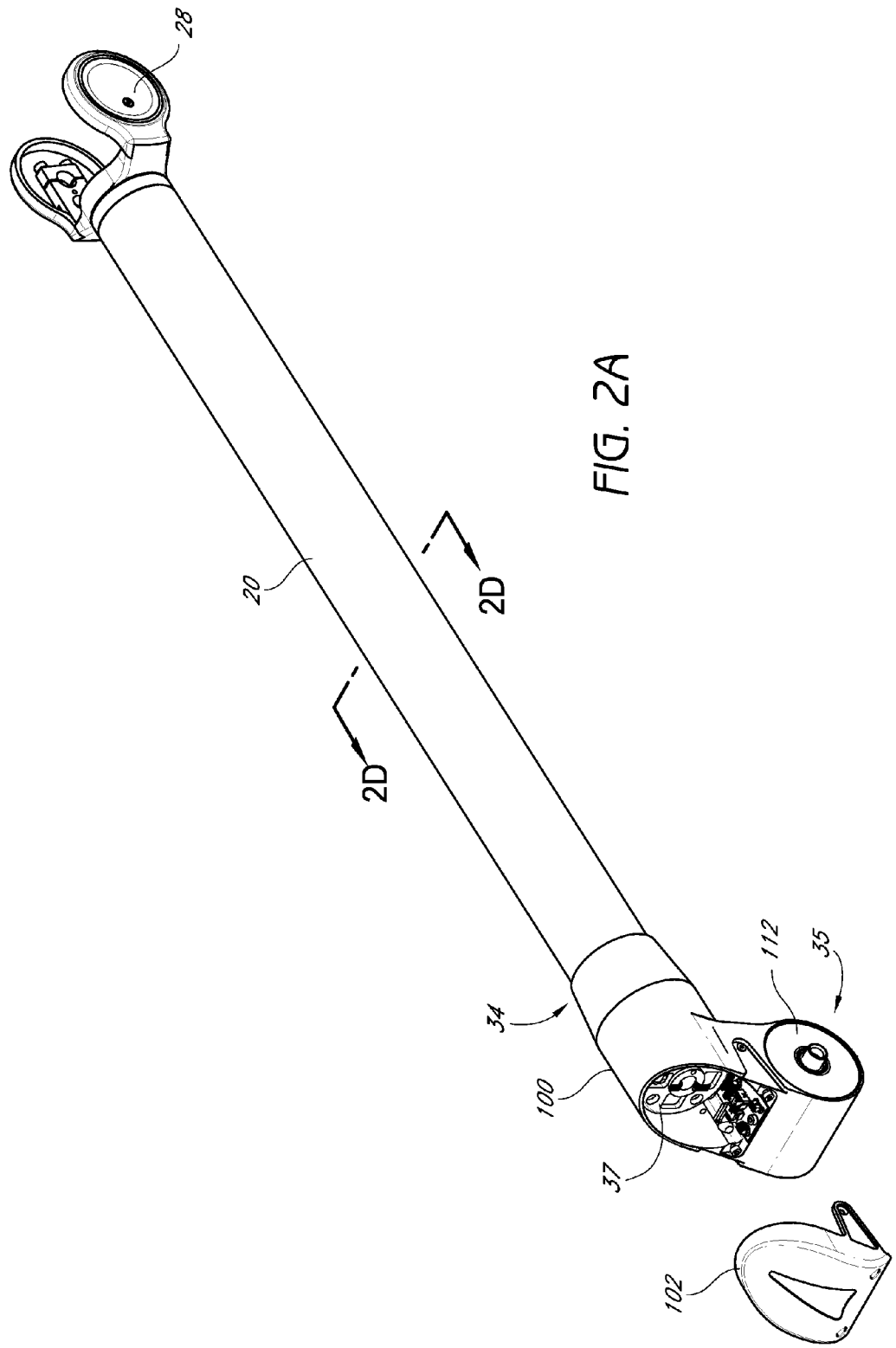

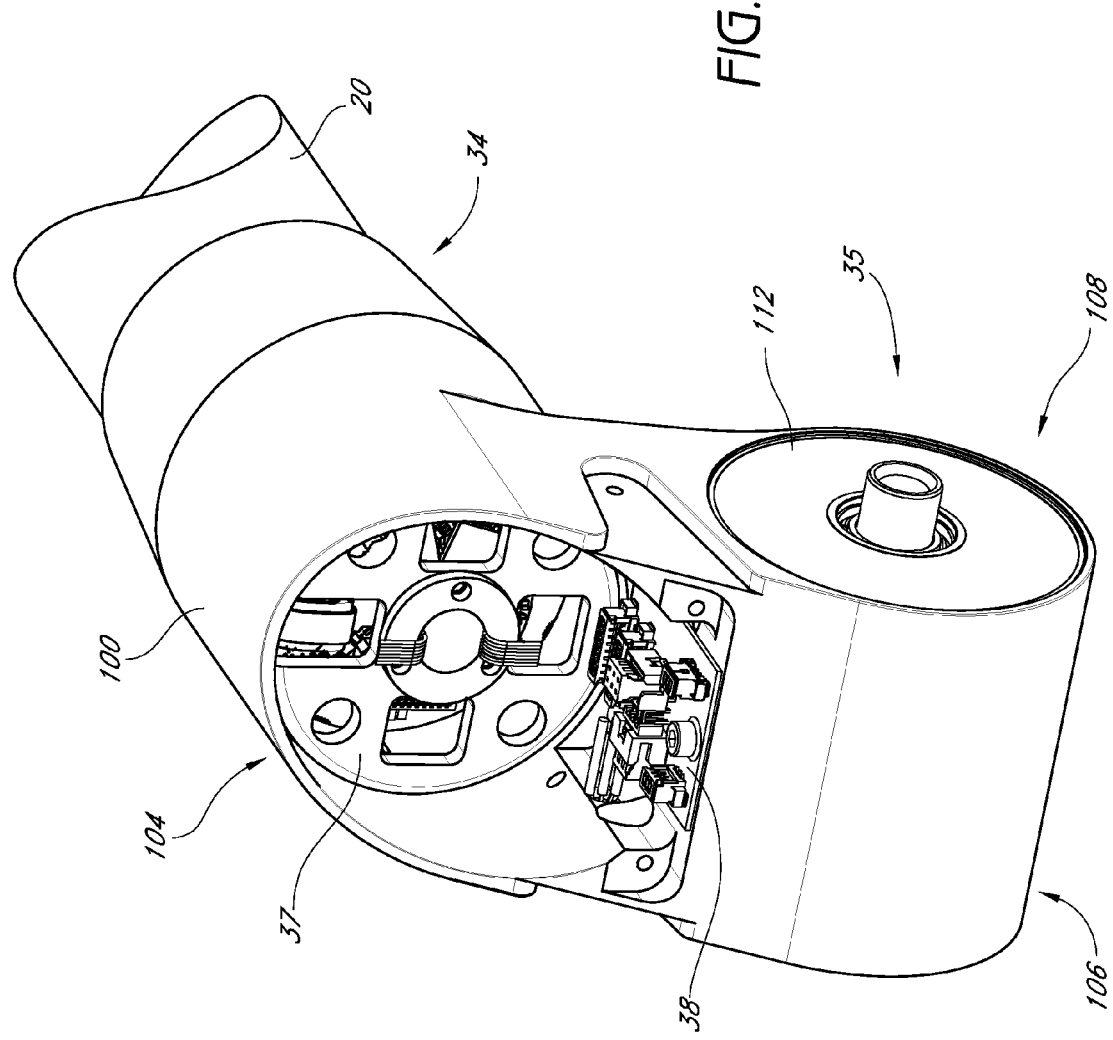

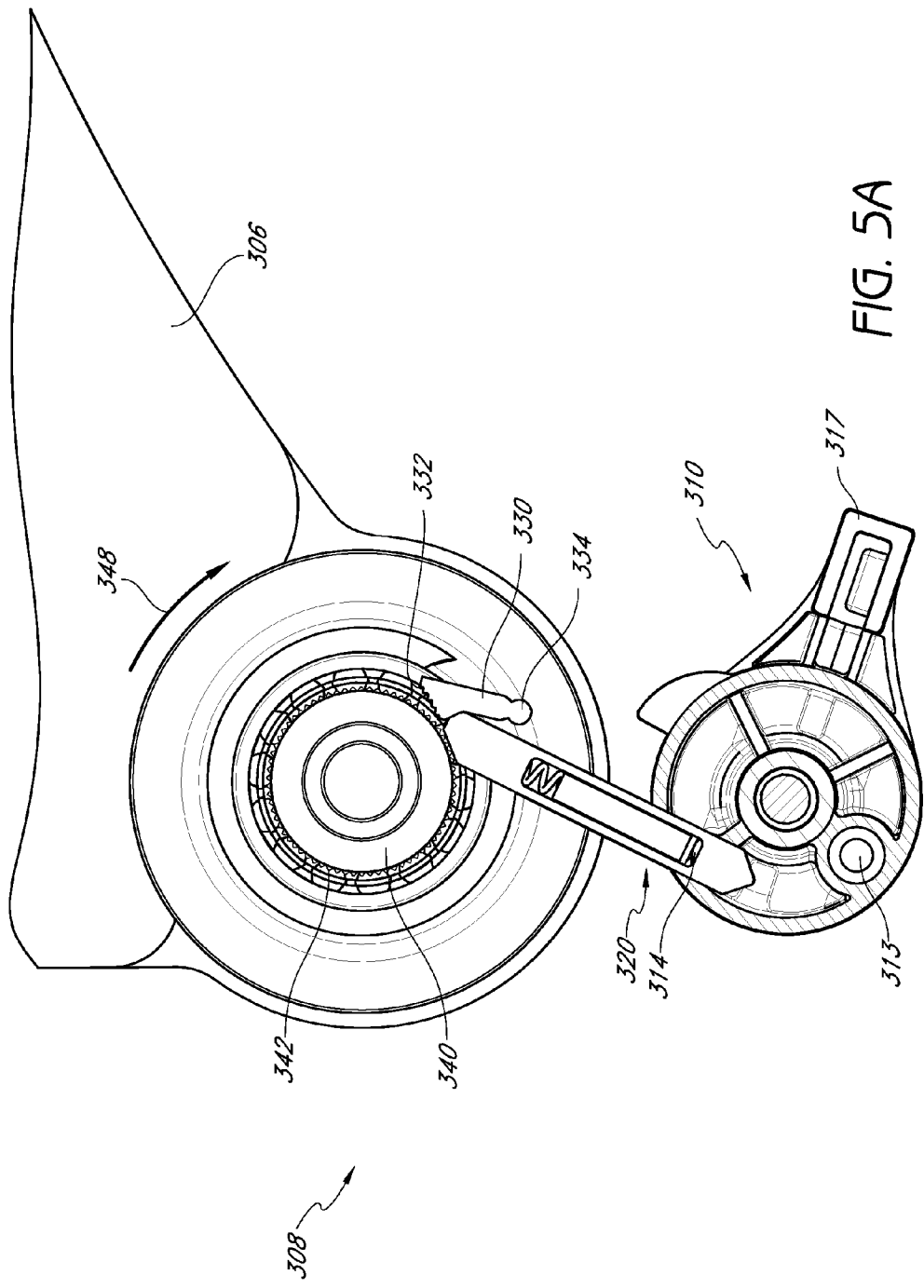

LOCKING COUNTERBALANCE FOR A CMM

BACKGROUND

1. Field

The present invention relates to articulated arms and coordinate measurement, and more particularly to coordinate measurement machines.

2. Description of the Related Art

Rectilinear measuring systems, also referred to as coordinate measuring machines (CMMs) and articulated arm measuring machines, are used to generate highly accurate geometry information. In general, these instruments capture the structural characteristics of an object for use in quality control, electronic rendering and/or duplication. One example of a conventional apparatus used for coordinate data acquisition is a portable coordinate measuring machine (PCMM), which is a portable device capable of taking highly accurate measurements within a measuring sphere of the device. Such devices often include a probe mounted on an end of an arm that includes a plurality of transfer members connected together by joints. The end of the arm opposite the probe is typically coupled to a moveable base. Typically, the joints are broken down into singular rotational degrees of freedom, each of which is measured using a dedicated rotational transducer.

During a measurement, the probe of the arm is moved manually by an operator to various points in the measurement sphere. At each point, the position of each of the joints must be determined at a given instant in time. Accordingly, each transducer outputs an electrical signal that varies according to the movement of the joint in that degree of freedom. Typically, the probe also generates a signal. These position signals and the probe signal are transferred through the arm to a recorder/analyzer. The position signals are then used to determine the position of the probe within the measurement sphere. See e.g., U.S. Pat. Nos. 5,829,148 and 7,174,651, which are incorporated herein by reference in their entireties. In some instances, the user of a CMM may want to leave the arm in a fixed position for a period of time. One example of a fixed position would the CMM's resting position. In such cases, the arm should remain in its fixed position so that it does not fall and cause damage to the arm or the surface on which it falls. Additionally, the arm should move from its fixed position upon application of a high amount of force or upon an impact upon the arm to avoid damage to the arm from the high amount of force or impact.

Generally, there is a demand for such machines with a high degree of accuracy and stability, high reliability and durability, substantial ease of use and low cost, among other qualities. The disclosure herein provides improvements of at least some of these qualities.

SUMMARY

In one embodiment, an articulated arm CMM comprises a plurality of transfer members, a plurality of articulation members connecting at least two transfer members to each other, a coordinate acquisition member at a distal end, and a base at a proximal end. At least two of the articulation members can include at least one encoder and the at least two encoders can both be enclosed within a single monoblock housing.

In an additional embodiment, an articulated arm CMM comprises an articulated arm and a gas spring counterbalance. The articulated arm can include a plurality of articulated arm members, a coordinate acquisition member at a distal end, and a base at a proximal end. The gas spring counterbalance can support the arm at a rotational point between adjacent articulated arm members. Further, the gas spring counterbalance can connect to an articulated arm member closer to the base at a point nearer to the rotation point than to the base.

In yet another embodiment, an articulated arm CMM comprises an articulated arm and a gas spring counterbalance. The articulated arm can comprise a plurality of articulated arm members, a coordinate acquisition member at a distal end, and a base at a proximal end. The gas spring counterbalance can support the arm at a rotational point between two adjacent articulated arm members. Further, rotation at the rotational point can bring one of the two adjacent articulated arm members to a substantially horizontal position when the gas spring counterbalance is also brought to a substantially horizontal position.

In a further embodiment, an articulated arm CMM comprises an articulated arm and a handle. The articulated arm can include a plurality of articulated arm members, a coordinate acquisition member at a distal end, and a base at a proximal end. The handle can include electronics and be removable connected to the coordinate acquisition member.

In an additional embodiment, an articulated arm CMM can be locked in position using a ratchet lock. The ratchet lock can be used to prevent motion of the articulated arm in at least one direction when the CMM is in a fixed position. A lock release assembly can allow for release of the arm from a locked position when the arm is subject to a high torque load. The ratchet lock can be engaged or disengaged by using an actuator. The actuator can be a handle with a hinge, a slider, an electromechanical actuator with an input control unit (wireless or wired) or any other means configured to allow a user to engage and/or disengage the ratchet lock.

In one embodiment, an articulated arm CMM includes a plurality of transfer members and a plurality of articulation members that connect at least two of the transfer members to each other. The articulated arm CMM also includes a coordinate-acquisition member at the distal end of the arm and a lower support assembly at the proximal end. Additionally, the articulated arm CMM includes a releasable locking system mounted about one of the transfer members. This locking system affects a rotation of at least one of the transfer members. The locking system comprises a cradle member which has a pivot and is configured to support a rotation of at least one transfer member in at least one direction. The cradle member also has indentation configured to receive one or more balls. The locking system further has a detent hub rotatably mounted to the cradle member. The detent hub has one or more indentations to receive one or more balls. The balls can be reversibly disposed within the indentations of both the cradle member and the detent hub to rotationally fix the cradle member relative to the detent hub.

The locking system also includes a resilient member biasing the cradle member toward the detent hub to bias the balls into the indentations of both the cradle member and the detent hub to inhibit the cradle member from rotating relative to the detent hub. Upon application of a torque sufficient to overcome the resilient member, the balls can be released from the indentations of the cradle member and/or the detent hub to allow relative rotation between the cradle member and detent hub.

Additionally, the locking system includes a ratchet gear which is rotationally fixed to the detent hub. The locking system further includes a ratchet locking member configured to reversibly engage teeth on the ratchet gear in a ratcheting relationship. The locking member is biased toward engagement with the teeth of the ratchet gear. The locking system includes a release member that can prevent or allow engagement between the locking member and the ratchet gear depending on the position of the release member. Rotation of one or more of the transfer members is inhibited when the locking member is engaged with the ratchet gear unless force sufficient to overcome the resilient member is applied to the transfer member.

In another embodiment, an articulated arm CMM includes one or more articulated arm members, a coordinate acquisition member at a distal end, and a lower support assembly at a proximal end. The articulated arm CMM also comprises an arm support member mounted about the articulated arm CMM. The arm support member comprises a gear with circumferential teeth and an engagement member configured to reversibly engage the circumferential teeth of the gear to prevent rotation of the gear relative to the engagement member in at least one direction of rotation. The arm support member further comprises a release member movable between a first and second position, wherein the release member prevents engagement between the engagement member and gear when in a first position and does not prevent said reversible engagement when in a second position. As a result, the arm support member hinders the rotation of the one or more articulated arm members when the lock release member is in a second position, but does not when the release member is in a first position.

In a further embodiment, an articulated arm CMM comprises a plurality of transfer members, a plurality of articulation members connecting at least two transfer members to each other, a coordinate acquisition member at a distal end of the CMM, and a lower support member at a proximal end. The CMM further comprises a releasable locking system mounted about the CMM to support one or more of the transfer members during rotation. The releasable locking system comprises a cradle support member, a detent hub, and a resilient member. The cradle support member comprises a pivot and one or more surface engagement features and is configured to support at least one transfer member during rotation. The detent hub is rotatably mounted to the cradle support member and is configured to be rotationally fixed to a portion of the lower support assembly. The detent hub comprises one or more surface engagement features which are configured to reversibly engage with the one or more surface engagement features of the cradle support member.

The resilient member is configured to bias the cradle support member toward the detent hub such that the one or more surface engagement features of the cradle support member engage with the one or more surface engagement features of the detent hub to rotationally fix the cradle support member relative to the detent hub. The surface engagement features of the cradle support member can be released from the surface engagement features of the detent hub when a torque sufficient to overcome the resilient member is provided. Release of the two sets of engagement features from one another allows for relative rotation between the cradle support member and the detent hub.

In a further embodiment, an articulated arm CMM comprises an articulated arm and an arm support member. The articulated arm comprises one or more articulated arm members, a coordinate acquisition member at a distal end, and a lower support assembly at a proximal end. The arm support member is mounted about the articulated arm CMM and supports one or more articulated arm members during rotation. The arm support member comprises a ratchet mechanism and an actuator. The actuator is configured to receive input to transfer the ratchet mechanism between an engaged and disengaged state. The ratchet mechanism is configured to hinder the rotation of one or more articulated arm members when the ratchet mechanism is in an engaged state.

In another embodiment, an articulated arm CMM comprises an articulated arm and a releasable locking system. The articulated arm comprises a plurality of transfer members connecting at least two transfer members to each other, a coordinate acquisition member at a distal end, and a lower support assembly at a proximal end. The releasable locking system is mounted about the articulated arm CMM and supports one or more of the transfer members during rotation. The releasable locking system comprises a lock device and a release device. The lock device is configured to prevent relative rotation in at least one direction between the one or more transfer members and the lower support assembly. The release device is configured to release the lock device upon the application of a heavy load upon the one or more transfer members.

BRIEF DESCRIPTION OF THE DRAWINGS

Further objects, features and advantages will become apparent from the following detailed description taken in conjunction with the accompanying figures showing illustrative embodiments, in which:

FIG. 2A is a perspective view of the transfer member of FIG. 2 with a cover portion removed;

FIG. 2B is an enlarged perspective view of the transfer member of FIG. 2A;

FIG. 5A is a left-side view of a ratchet lock assembly with a lower support assembly and additional associated components hidden;

DETAILED DESCRIPTION

Figure 1:
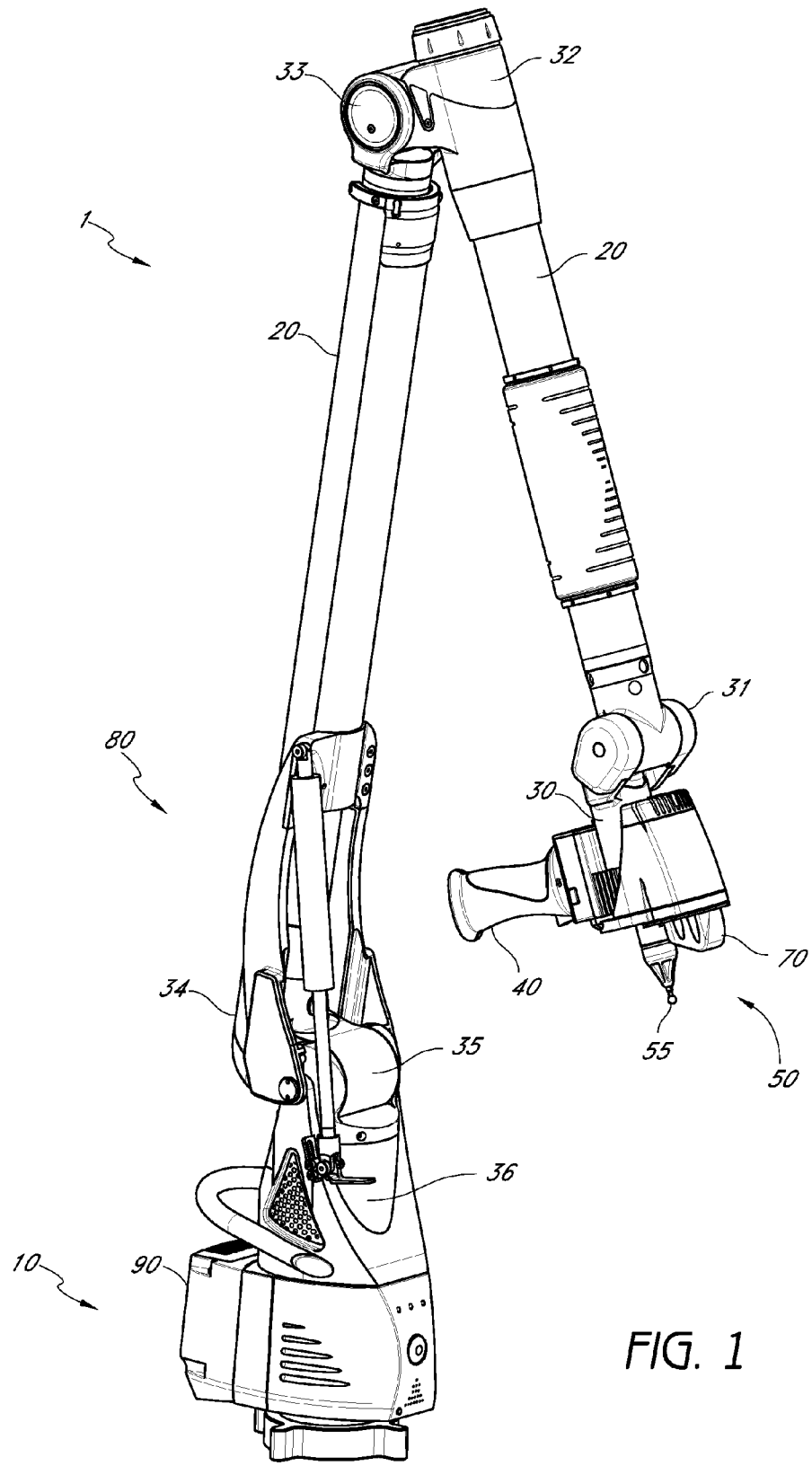
FIG. 1 is a perspective view of an articulated arm.
Figure 1A:
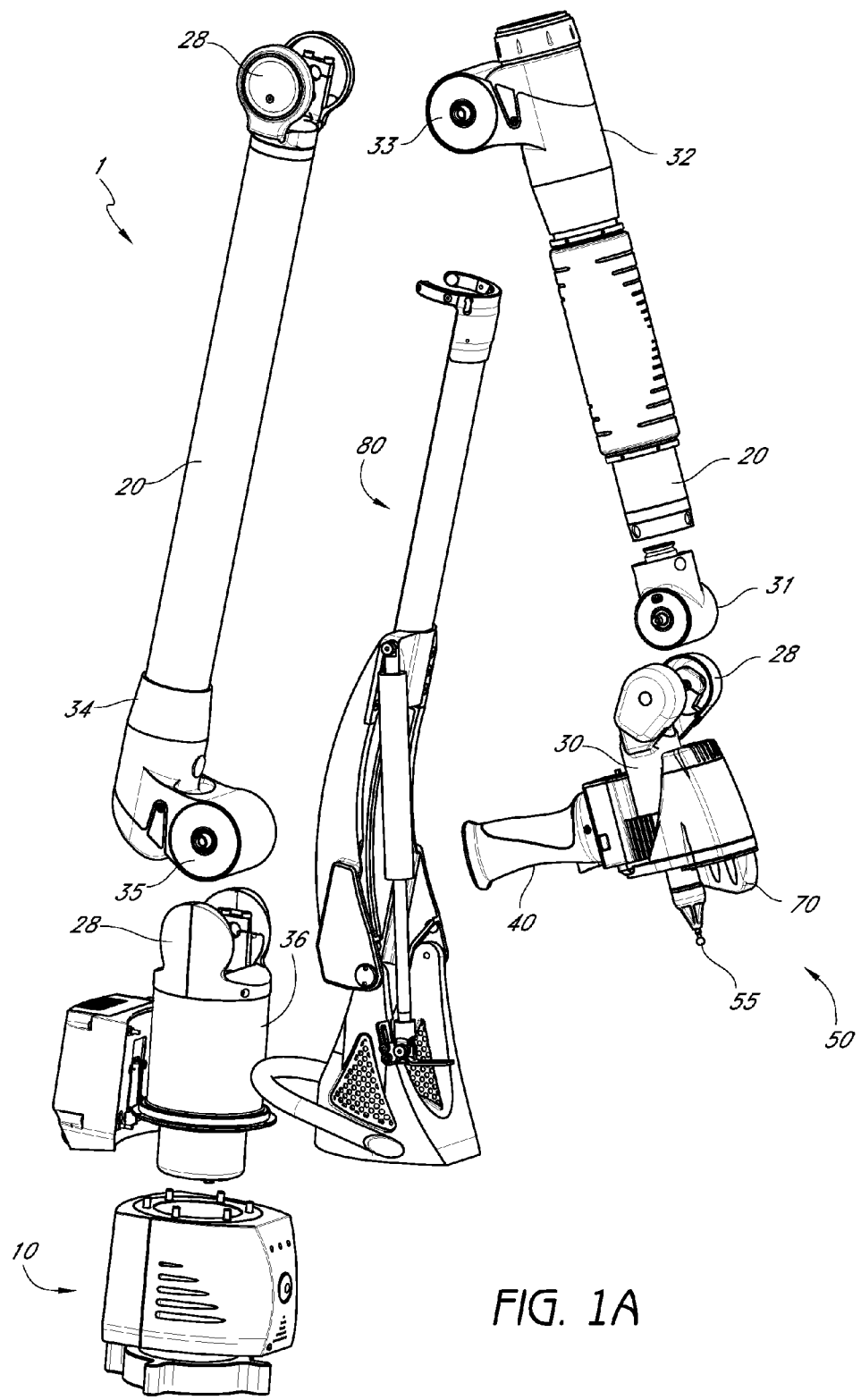
FIGS. 1A is an exploded view of the articulated arm of FIG. 1.

FIGS. 1 and 1A illustrate one embodiment of a portable coordinate measuring machine (PCMM) 1 in accordance with the present invention. In the illustrated embodiment, the PCMM 1 comprises a base 10, a plurality of rigid transfer members 20, a coordinate acquisition member 50 and a plurality of articulation members 30-36 that form "joint assemblies" connecting the rigid transfer members 20 to one another. The articulation members 30-36 along with the transfer members 20 and hinges (described below) are configured to impart one or more rotational and/or angular degrees of freedom. Through the various members 30-36, 20, the PCMM 1 can be aligned in various spatial orientations thereby allowing fine positioning and orientating of the coordinate acquisition member 50 in three dimensional space.

The position of the rigid transfer members 20 and the coordinate acquisition member 50 may be adjusted using manual, robotic, semi-robotic and/or any other adjustment method. In one embodiment, the PCMM 1, through the various articulation members 30-36, is provided with seven rotary axes of movement. It will be appreciated, however, that there is no strict limitation to the number of axes of movement that may be used, and fewer or additional axes of movement may be incorporated into the PCMM design.

In the embodiment PCMM 1 illustrated in FIG. 1, the articulation members 30-36 can be divided into two functional groupings based on their associated motion members operation, namely: 1) those articulation members 30, 32, 34, 36 which are associated with the swiveling motion associated with a specific and distinct transfer member (hereinafter, "swiveling joints"), and 2) those articulation members 31, 33, 35 which allow a change in the relative angle formed between two adjacent members or between the coordinate acquisition member 30 and its adjacent member (hereinafter, "hinge joints" or "hinges"). While the illustrated embodiment includes four swiveling joints and three hinge joints positioned as to create seven axes of movement, it is contemplated that in other embodiments, the number of and location of hinge joints and swiveling joints can be varied to achieve different movement characteristics in a PCMM. For example, a substantially similar device with six axes of movement could simply lack the swivel joint 30 between the coordinate acquisition member 50 and the adjacent articulation member 20. In still other embodiments, the swiveling joints and hinge joints can be combined and/or used in different combinations.

As is known in the art (see e.g., U.S. Pat. No. 5,829,148, which is hereby incorporated by reference herein) and depicted in FIG. 2D, the transfer members 20 can comprise a pair of dual concentric tubular structures having an inner tubular shaft 20a rotatably mounted coaxially within an outer tubular sheath 20b through a first bearing mounted proximately to a first end of the member adjacent and a second bearing located at an opposite end of the member and which can be positioned within the dual axis housing 100. The transfer members 20 operate to transfer motion from one end of the transfer member to the other end of the transfer member. The transfer members 20 are, in turn, connected together with articulation members 30-36 to form joint assemblies.

The hinge joint, in turn, is formed, in part, by the combination of a yoke 28 extending from one end of a transfer member (see FIG. 1A), the rotational shaft extending through the articulation members 31, 33, 35 and the articulation members 31, 33, 35 themselves, which rotate about the rotational shaft to form a hinge or hinge joint.

Figure 2:
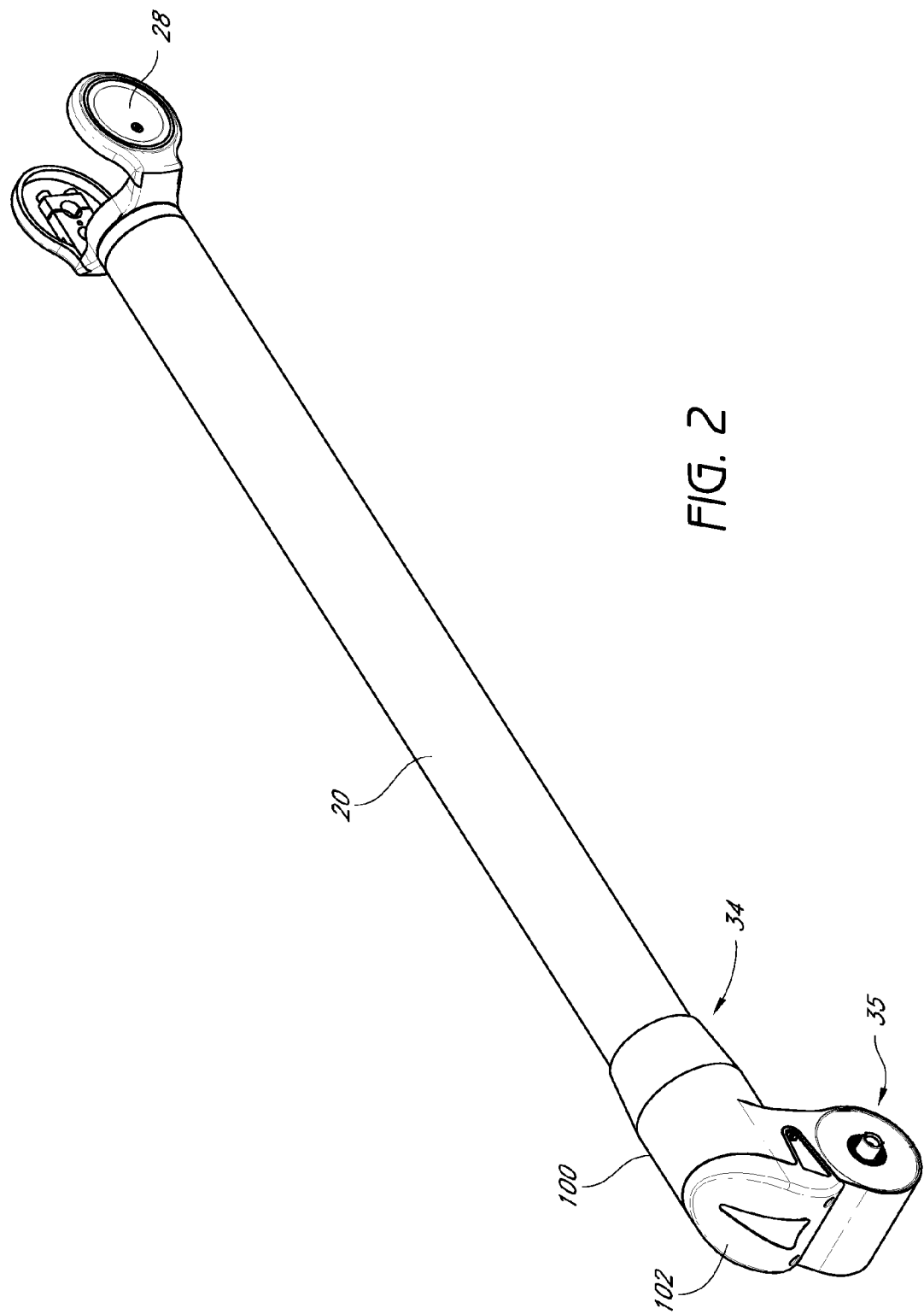
FIG. 2 is a perspective view of a transfer member of the articulated arm of FIG. 1 with its associated articulation members.
Figure 2D:
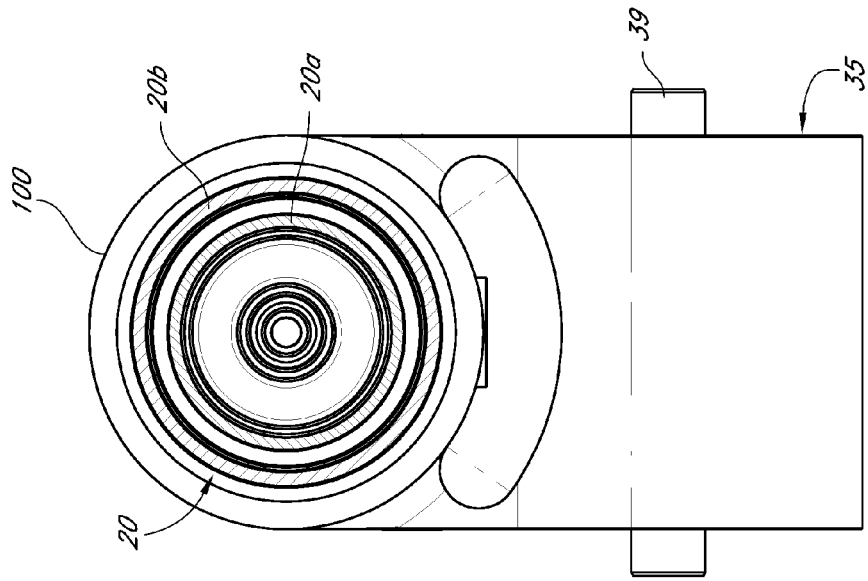
FIG. 2D is an enlarged cross-sectional view of the transfer member of FIG. 2B.
Figure 2C:
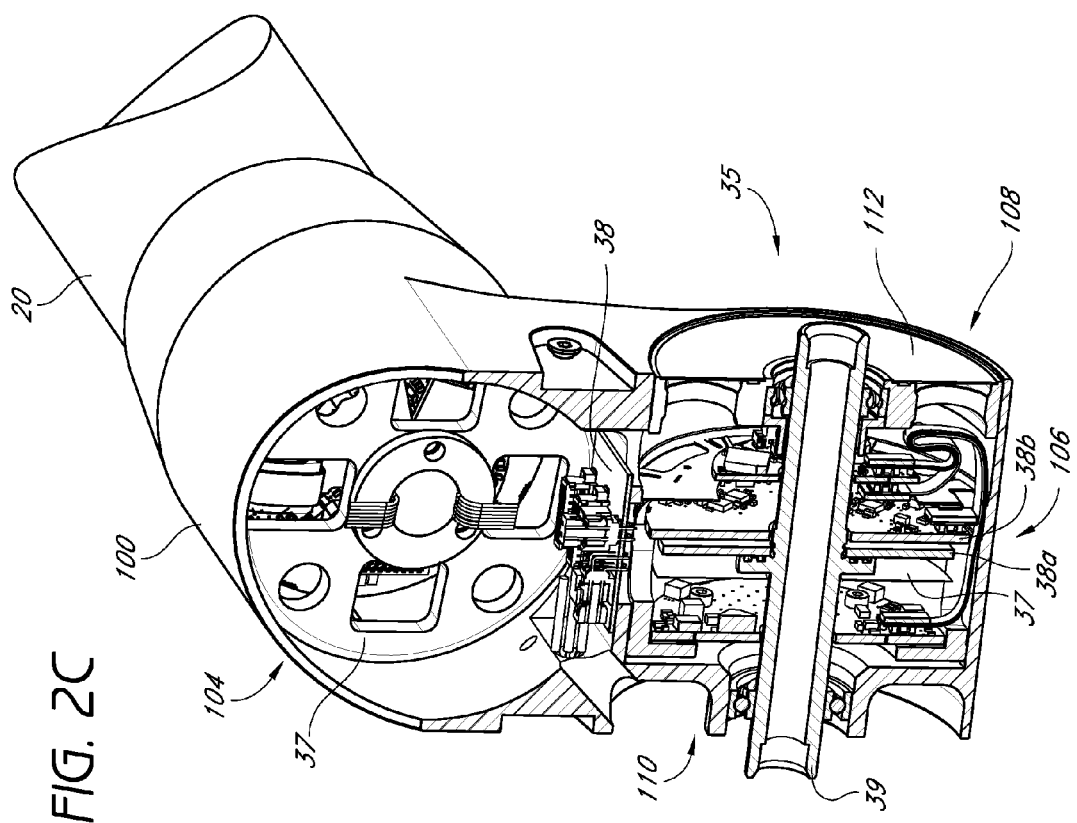
FIG. 2C is an enlarged cross-sectional view of the articulation members of FIG. 2

Each hinge or swiveling joint has its own dedicated motion transducer in the form of an encoder 37 which can be seen in FIG. 2C. Advantageously, both the hinge and swiveling joint encoders are positioned at least partially, and more preferably, entirely within the dual axis housing 100 within the respective articulation members 30-36.

In various embodiments, the coordinate acquisition member 50 comprises a contact sensitive member 55 (depicted as a hard probe in FIG. 1) configured to engage the surfaces of a selected object and generate coordinate data on the basis of probe contact. In the illustrated embodiment, the coordinate acquisition member 50 also comprises a non-contact scanning and detection component that does not necessarily require direct contact with the selected object to acquire geometry data. As depicted, the non-contact scanning device comprises a non-contact coordinate detection device (shown as a laser coordinate detection device/laser scanner) that may be used to obtain geometry data without direct object contact. The non-contact scanning device can include a camera or other optical device 70, which functions in conjunction with a laser not depicted herein. It will be appreciated that various coordinate acquisition member configurations including: a contact-sensitive probe, a non-contact scanning device, a laser-scanning device, a probe that uses a strain gauge for contact detection, a probe that uses a pressure sensor for contact detection, a device that uses an infrared beam for positioning, and a probe configured to be electrostatically-responsive may be used for the purposes of coordinate acquisition. Further, in some embodiments, a coordinate acquisition member 50 can include one, two, three, or more than three coordinate acquisition mechanisms.

Further description of certain embodiments of a coordinate acquisition member that can be used with the embodiments described herein can be found in U.S. patent application Ser. No. 12/487,535, filed 18 Jun. 2009 and entitled ARTICULATING MEASURING ARM WITH LASER SCANNER, which is incorporated by reference herein in its entirety. As depicted in said reference, the coordinate acquisition member can include a modular laser scanner that can attach to the main body of the coordinate acquisition member (which can also include a touch probe). The modular features can allow various other coordinate detection devices to be used with the coordinate acquisition member. Additionally, other coordinate acquisition members can be used, as is generally known by those of skill in the art.

Advantageously, as depicted in FIGS. 2-2C, the articulation members 30-36 form a dual-axis housing 100. The dual-axis housing 100 can be a single monoblock housing, a housing comprising multiple pieces bonded together (e.g. by welding, adhesive, etc.), or otherwise. As depicted, the dual-axis housing 100 can be coupled to the transfer members 20 and comprise part of hinge and swivel joints, corresponding to the second and third axes of rotation from the base 10. As noted above, separately functional rotational encoders 37 and associated electronics for measuring a position of the transfer members and hinge and swivel joints (as are generally known by those of skill in the art) can be positioned in the articulation members 34 and 35 (as well as the articulation members 30-33 and 36, depicted in other figures).

To facilitate assembly of the dual-axis assembly, the dual-axis housing 100 can include a removable back cover 102, shown removed in FIG. 2A. As depicted, the removable cover 102 can cover an opening in the housing 100 generally axially aligned with an adjacent transfer member 20 mounted to the housing. Further, in some embodiments the cover 102 can be configured so as not to bare any significant load of the CMM 1. Accordingly, it may be desirable to form the cover 102 of a less rigid material that can also serve as a shock absorber. As depicted, the cover 102 can be positioned at an "elbow" position of the arm 1. During some activities the "elbow" positions may be more likely to abruptly contact an external, hard surface that could damage the arm 1. Advantageously, a cover 102 formed of a shock absorbent material can protect the arm 1 from such damage. Even further, in some embodiments the material of the cover 102 can also serve to promote enhanced sealing with the material of the dual-axis housing 100. The dual-axis housing 100 can comprise a rigid material, and the cover 102 can comprise a more flexible material that can conform to the edges of the housing when mounted thereto, creating an enhanced seal.

Figure 2E:
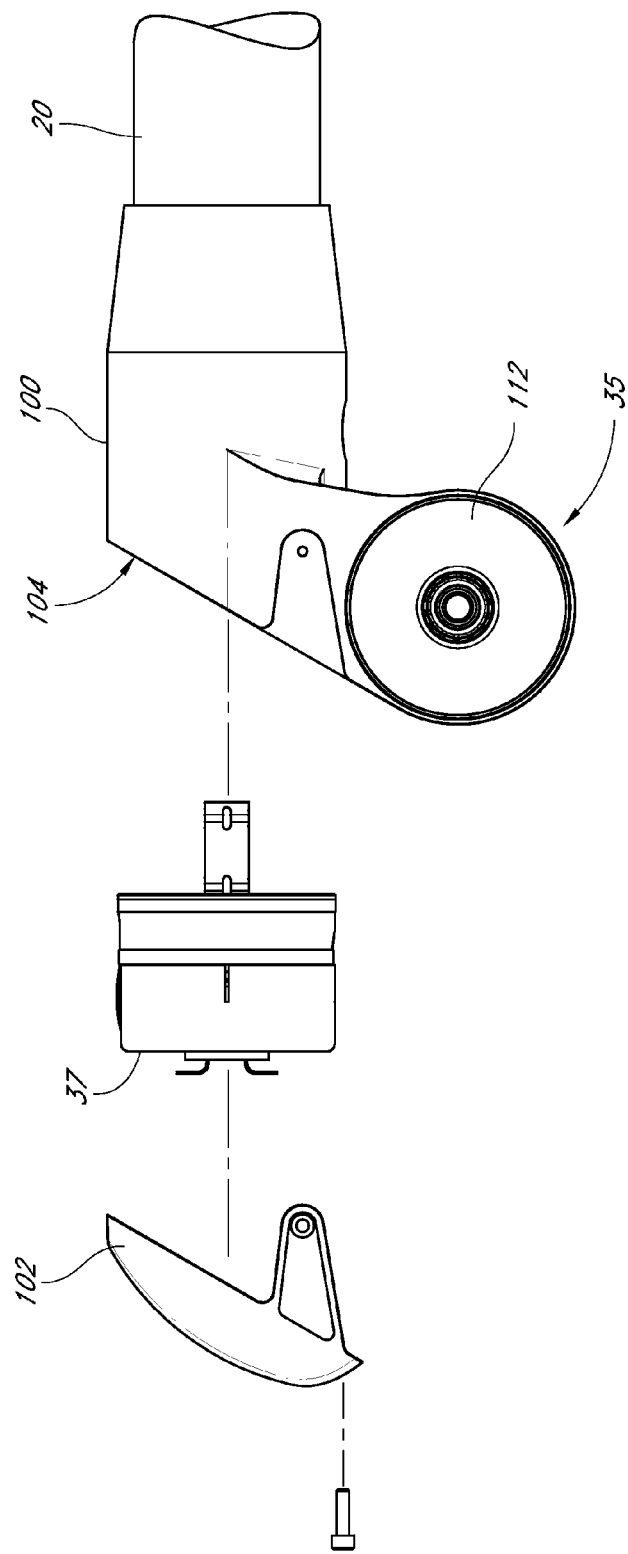
FIG. 2E is a partially exploded side view of the transfer member and articulation members of FIG. 2.

The removable back cover 102 can provide a general sealing of the interior of the dual-axis housing 100 from the external elements, protecting the encoders 37 positioned within the housing. When the cover 102 is removed the separate encoder 37 associated with the articulation member 34 can be exposed and inserted/removed from the dual-axis housing 100 into a swivel-receiving portion 104 generally axially aligned with the depicted transfer member 20 (as depicted in FIG. 2E). In the illustrated embodiment, the encoders associated with the articulation members 34 and 35 are separate components from the transfer members 20. That is, the encoder and transfer member are two separate and distinct components that are connected together but can rotatably operate apart from each other. The same principle can also be applied to the other articulation members 30-33 and 36. That is, the transfer members 20 can operate separately from the articulation members 30-36 that form a joint or joint assembly as described above and operate to measure rotation.

Additionally, additional electronics can be inserted/removed while the cover 102 is removed, as depicted in FIG. 2B. As shown, the dual-axis housing 100 can provide a receiving portion for a printed circuit board 38 that can hold additional electronics. In some embodiments, the additional electronics can perform additional signal processing such as digitizing an analog signal from the encoders. In some embodiments, such digitization can be performed prior to passing the signal to slip rings or other rotatable electronic connections. Further, in some embodiments the additional printed circuit board 38 can facilitate forming the physical electronic connection between both encoders within the dual-axis housing 100.

Further, in the depicted dual-axis housing 100 the separate encoder 37 associated with the articulation member 35 can be inserted/removed independent of the back cover 102. To facilitate this insertion/removal, the dual-axis housing 100 can have a hinge-receiving portion 106 oriented perpendicularly from a primary plane of the housing. The hinge-receiving portion 106 can have an open end 108, into which the encoder 37 can enter, and a substantially closed end 110 against which the encoder can abut to define a position for the encoder. Once the encoder 37 has been inserted, a cap piece 112 can then be inserted to secure the encoder within the hinge-receiving portion 106.

As depicted in FIG. 2C, the encoder 37 can include an encoder disk 38a and a read head 38b. The encoder disk 38a can have a pattern on its surface that can be measured by the read head 38b. For example, in some embodiments the encoder disk 38a can have an optical pattern including varying colors, transparent and opaque portions, or other visible variations; and the read head 38b can include an optical measuring device such as a camera. In some embodiments the disk 38a can have a defined pattern of lines on the disk similar to a bar code such that any image of the disk by the read head can define an absolute rotational angle, as further discussed below. As another example, the encoder disk 38a can have varying magnetic portions and the read head 38b can measure a corresponding magnetic field. The varying patterns on the encoder disk 38a can be measured by the read head 38b to indicate a rotational position, or a change in rotational position of the encoder disk relative to the read head. In turn, as depicted, the read head 38b can be rotationally fixed with the housing 100 and the encoder disk 38a can be rotationally fixed to an encoder shaft 39 that is rotatably mounted within the housing. Thus, rotation of the shaft 39 relative to the housing 100 can cause a corresponding relative rotation between the disk 38a and read head 38b that can be measured. However, it will be clear from the description herein that the apparatus can vary. For example, in some embodiments the read head 38b can be rotatably mounted to the housing 100 and the encoder disk 38a can be rotatably fixed.

In the depicted embodiment, the encoder associated with the articulation member 35 can mount with an adjacent transfer member, not shown in FIG. 2, via a fork joint on the transfer member and the encoder shaft 39. Said fork joint can be similar to that depicted at the end of the depicted transfer member 20 opposite the dual-axis housing 100, with a yoke 28 that can mount to the encoder shaft 39 rotatably mounted within the housing 100. The forks of the yoke 28 can mount about the ends of the dual-axis housing 100 and its contained encoder to form a hinge articulation member 35. Accordingly, both encoders in the dual-axis housing 100 can be inserted/removed independently of one another from the single housing. Notably, in other embodiments the form of the dual-axis housing 100 can vary. For example, in some embodiments the dual-axis housing 100 can form two swivel-receiving portions 104, or two hinge-receiving portions 106, as opposed to one of each.

Placing the encoders 37 into a single housing can provide numerous advantages over prior art assemblies with separate housings. For example, the combined housing can reduce the number of parts and joints required, and thus also reduce cost and assembly time. Further, the accuracy of the device can improve from the elimination of deflection, misalignment, or other problems with multiple components. Additionally, removal of the additional housing can allow a more compact combined joint assembly, allowing the arm to be better supported and have less weight. As shown FIG. 1A, a yoke 28 of the next or proceeding transfer member 20 can be coupled to the bearing shaft extending through dual axis housing 100 to form the hinge joint.

Although depicted as enclosing the second and third axes from the base, a similar dual-axis housing 100 can be used with other combinations of articulation members, such as the fourth and fifth articulation members 32, 33. Further, the dual-axis housing can provide additional advantages not explicitly discussed herein. However, it should be noted that in other embodiments of the inventions described herein, the articulation members 30-36 can each have a separate housing.

It should be appreciated that the dual-axis housing or joint assembly described above can be used in other types of CMMs and need not be used in combination with the additional embodiments described below.

Figure 3:
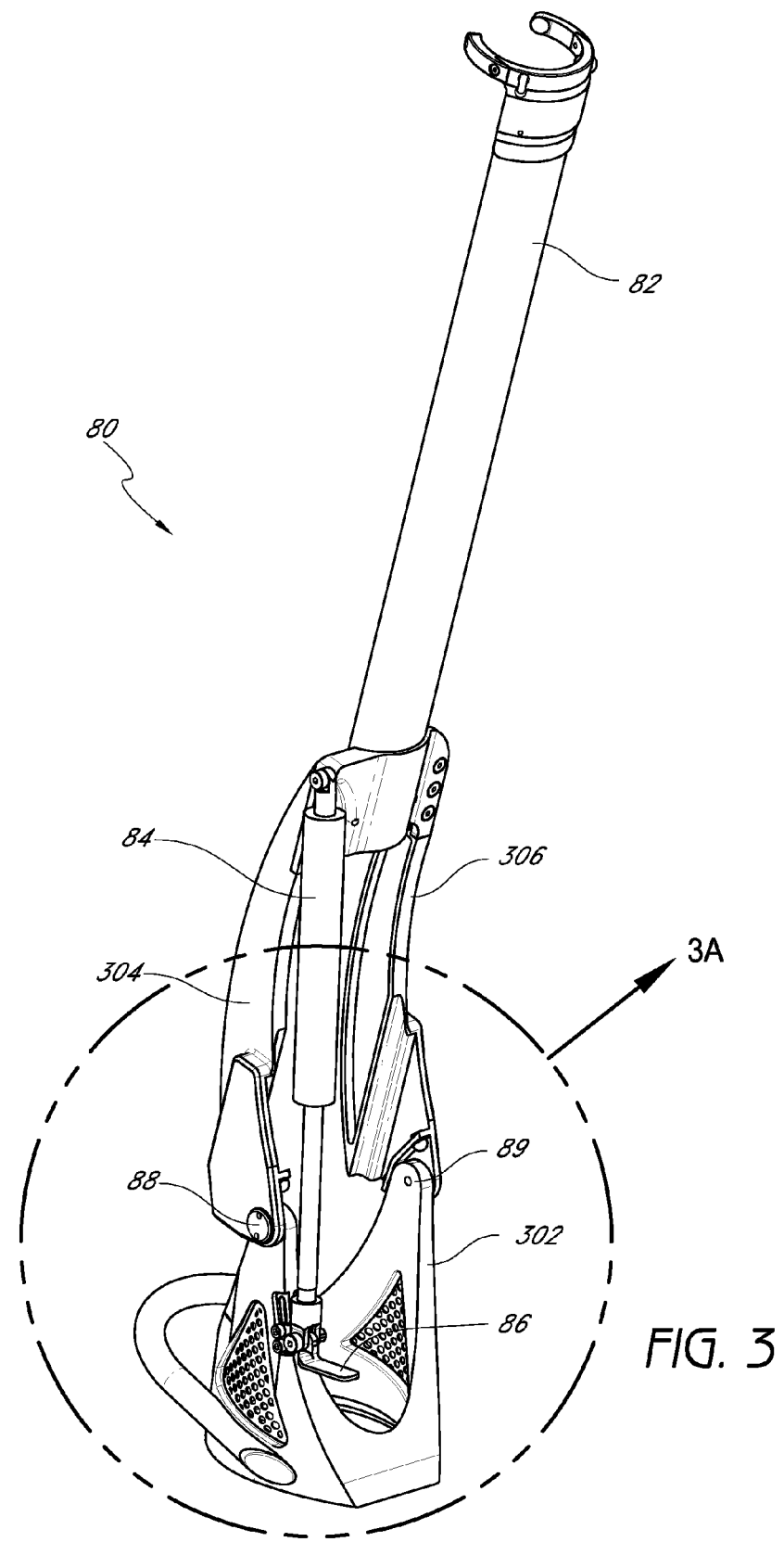
FIG. 3 is a perspective view of a counterbalance system of the articulated arm of FIG. 1.
Figure 3A:
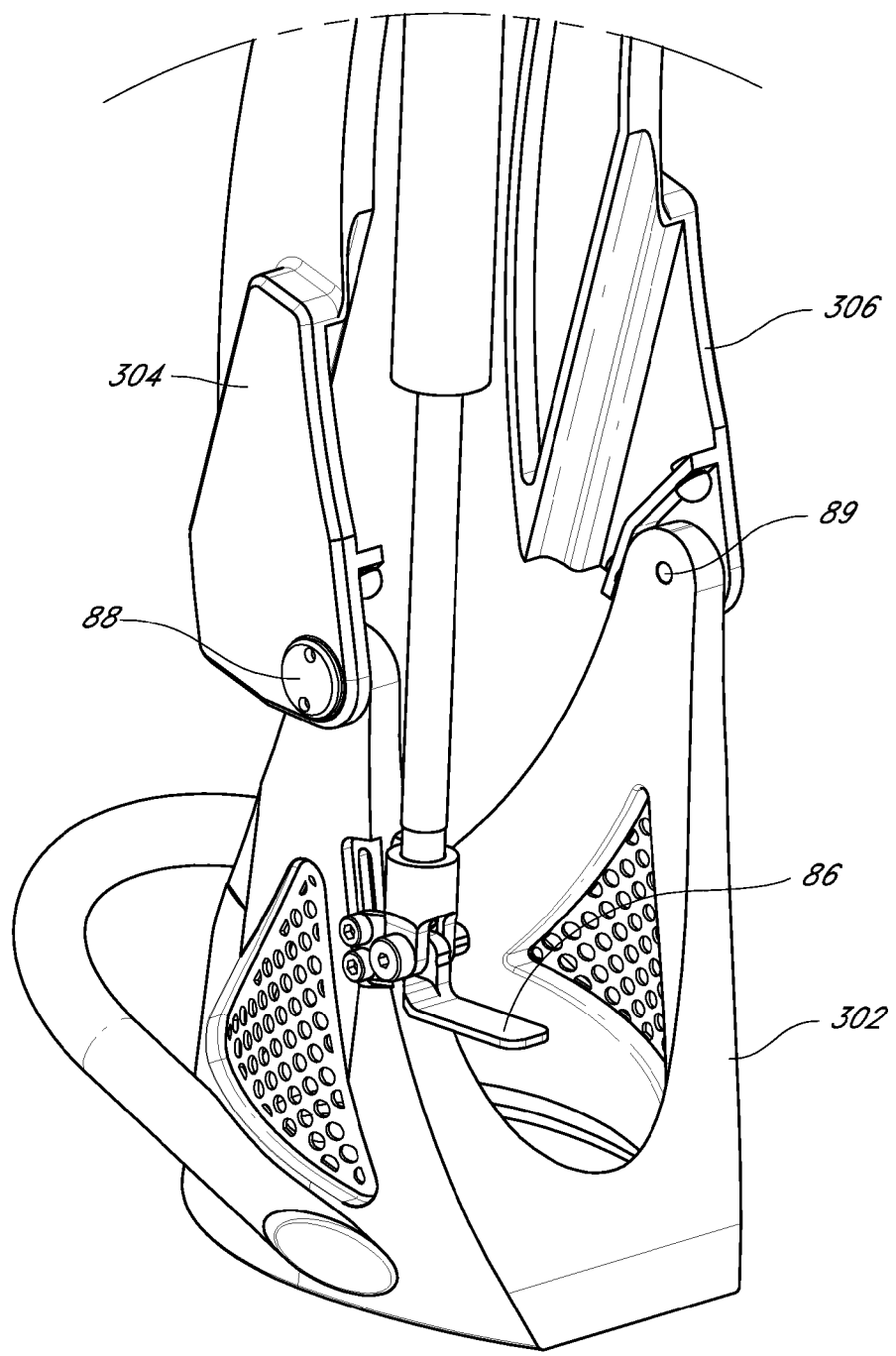
FIG. 3A is an exploded view of the counterbalance system of FIG. 3.
Figure 3B:
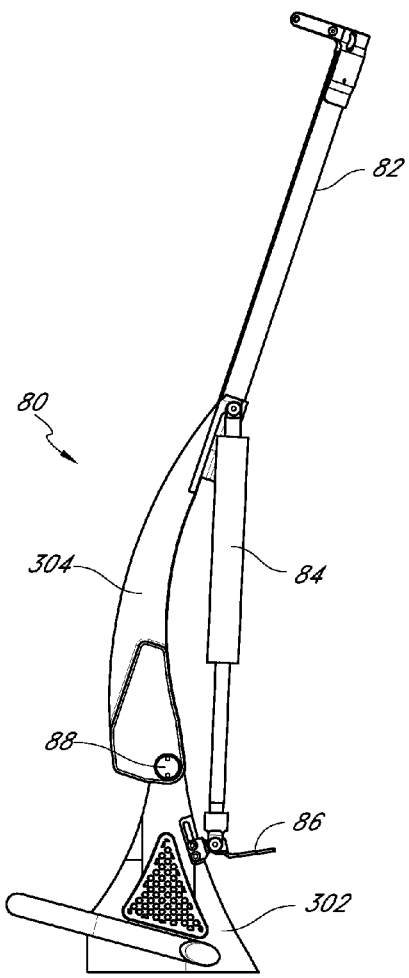
FIG. 3B is a side view of the counterbalance system of FIG. 3 in a first position.
Figure 3C:
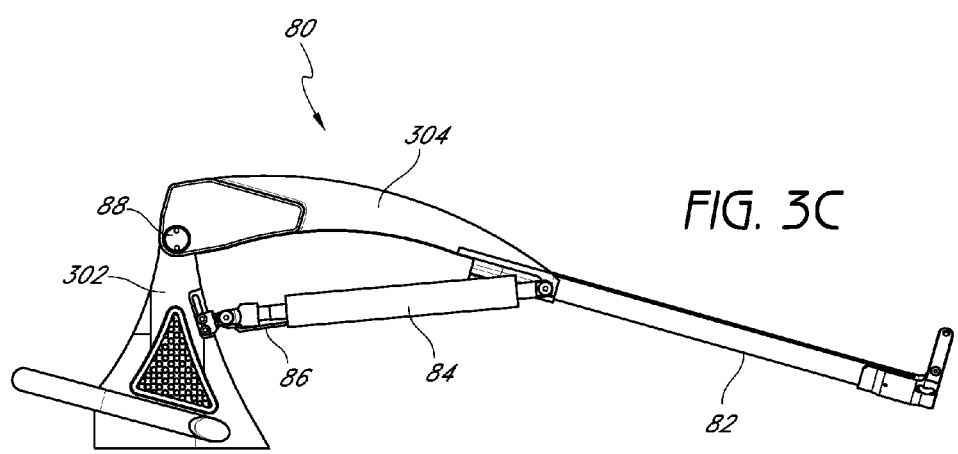
FIG. 3C is a side view of the counterbalance system of FIG. 3 in a second position.

FIGS. 3-3C depict an embodiment of a support system for a CMM, specifically an improved counterbalance system 80. As depicted, the counterbalance system 80 can include a lower support member 302 rotatably attached to a cradle 82 via left and right cradle support members 304, 306. As shown, the two cradle support members 304, 306 can rotatably connect to the lower support member at pivots 88, 89. The right cradle support member 306 and left side cradle support member 304 are fixedly attached to the cradle 82 and the cradle 82 supports at least one transfer member 20 against the force of gravity. However in other embodiments the cradle 82 and the cradle support members 304, 306 can support at least one transfer member 20 in multiple directions, such as by fully enclosing the transfer member.

The counterbalance system 80 can also include a piston assembly 84 forming a gas shock counterbalance. A nitrogen charged gas spring can connect between points separated by a pivot 88 aligned with an articulation member such as the second-closest-to-the-base articulation member 35. As depicted, the connection point nearer the base 10 can be closer to the pivot 88 than to the base. This results in a counterbalance design where the gas shock is in a predominantly horizontal position when the second linkage is in a horizontal position, as depicted in FIG. 3C. The predominantly horizontal position of the gas shock can be further promoted by the position of the connection point further from the base. As depicted, the connection point further from the base can be positioned at approximately the mid-point of the transfer member 20 supported by the counterbalance system 80. Further, as depicted the piston assembly 84 can include a lock 86 that can increase the resistance against movement of the piston, thus preventing additional rotation of the aligned articulation member 35. In one embodiment the lock is implemented with a lever on the lock 86, pushing on a pin that opens and closes an aperture within the gas shock. The opening and closing of the aperture either allows or prevents the flow of gas within the piston.

This improved counterbalance system 80 can provide a number of advantages. For example, this design can allow the first axis of rotation from the base (associated with articulation member 36) to be shorter, reducing associated deflection. Additionally, this reduced length can be accomplished without a reduced angular span of rotation about the pivot 88. The improved counterbalance system 80 can also reduce the number of parts required, as the locking mechanism and the counterbalance mechanism can be integrally combined into a single system. Further, the piston assembly 84 can damp the motion about the pivot 88. This reduces the chance of damaging the CMM when a user tries to move the arm while it is still locked. However, it should be noted that in other embodiments of the inventions described herein, a different counterbalance system can be used, such as a weight provided on a back end of a transfer member 20. Further, in other embodiments of the inventions described herein, a different locking mechanism can be used, such as a rigid physical stop. It should be appreciated the improved counterbalance system 80 described above can be used in other types of CMMs and need not be used in combination with the additional embodiments described above and below the preceding section.

Another embodiment of the improved counterbalance system 80 is illustrated in FIGS. 4-7B. It should be appreciated that the additional features shown in the embodiment of FIGS. 4-7B are shown in combination with other elements, such as the gas shock described above. Further embodiments that can be used with the counterbalance system 80 are described in U.S. Patent Publication No. 2011/0107612, published May 12, 2011, which is incorporated by reference herein in its entirety. However, these features can also be used in other types of CMMs and need not be used in combination with the additional embodiments described herein. In some embodiments, the counterbalance system 80 can include a means of mechanically preventing or inhibiting motion of the articulated arm in at least one direction. For example, the lower support assembly 302 can comprise a ratchet lock 308 in addition to or instead of the above described lock 86 on the piston assembly 84. The ratchet lock 308, when engaged, can inhibit the left or right cradle support members 304, 306 of the improved counterbalance system 80 from moving in at least one direction about a pivot point 88, 89. For example, the ratchet lock 308 can be used to inhibit the cradle support members 304, 306 from moving out of a "resting" position, in which the arm is substantially folded upon itself and the counterbalance system 80 is substantially upright, as illustrated in FIG. 3B. A user of the articulated arm CMM can engage and/or disengage the ratchet lock 308 by using an actuator 310, to allow or inhibit movement of the counterbalance system 80 and thus the articulated arm CMM.

Figure 4:
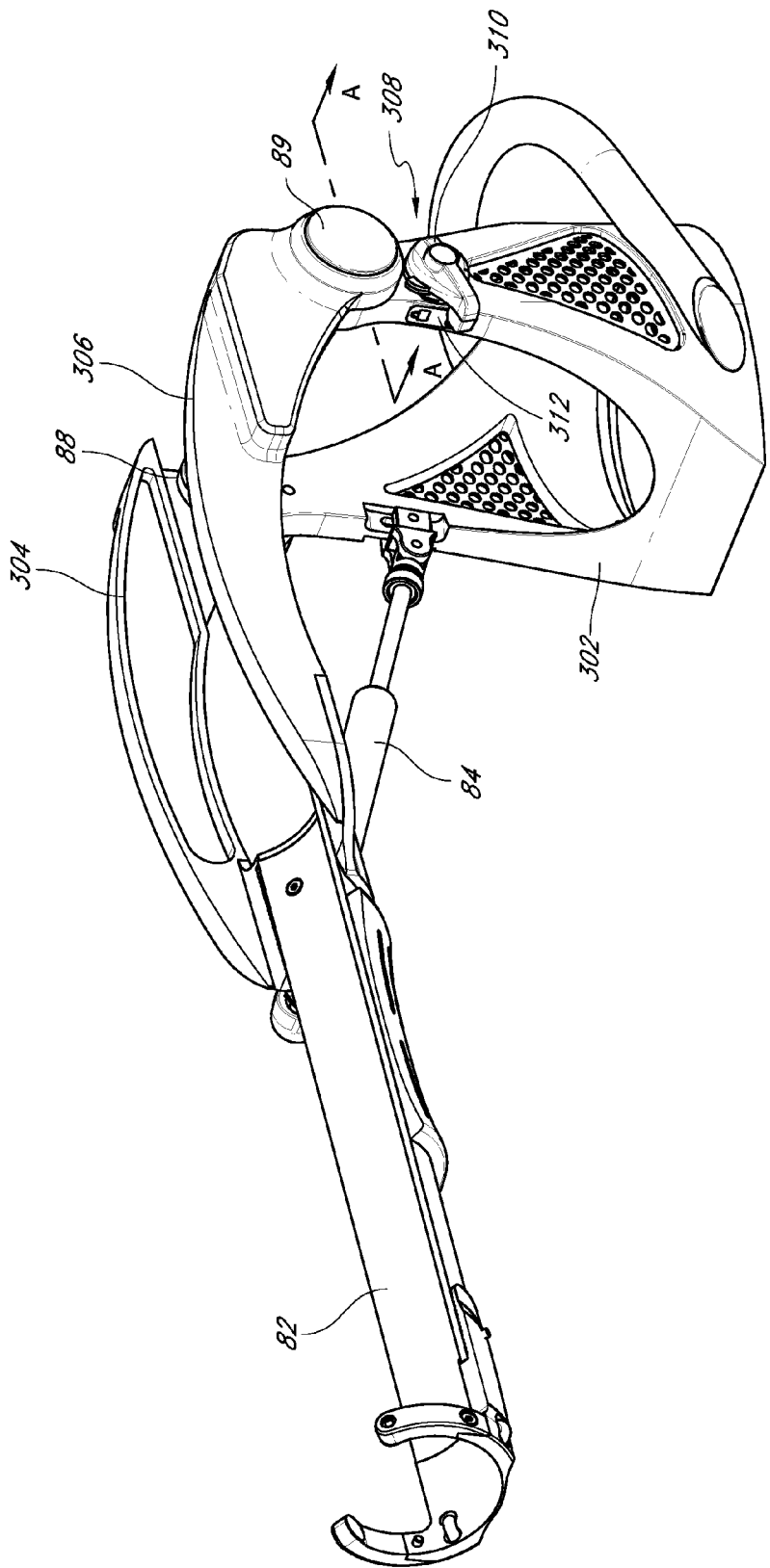
FIG. 4 is a perspective view of another embodiment of a counterbalance system.

FIG. 4 illustrates an embodiment of the CMM where the ratchet lock 308 is mounted on the right side of the lower support assembly 302 as to inhibit the movement of the right cradle support member 306. Because the right side cradle support member 306 is fixedly attached to the cradle 82 and the cradle 82 supports at least one transfer member 20, motion of the at least one transfer member 20 is inhibited in at least one direction when the motion of the right cradle support member 306 is limited. In some embodiments, the ratchet lock 308 could also be mounted to any rotatable joint of the articulated arm CMM, including, but not limited to the left side of the lower support assembly 302. A visual indicator 312 indicates whether the ratchet lock 308 is in an engaged or disengaged position.

Figure 5B:
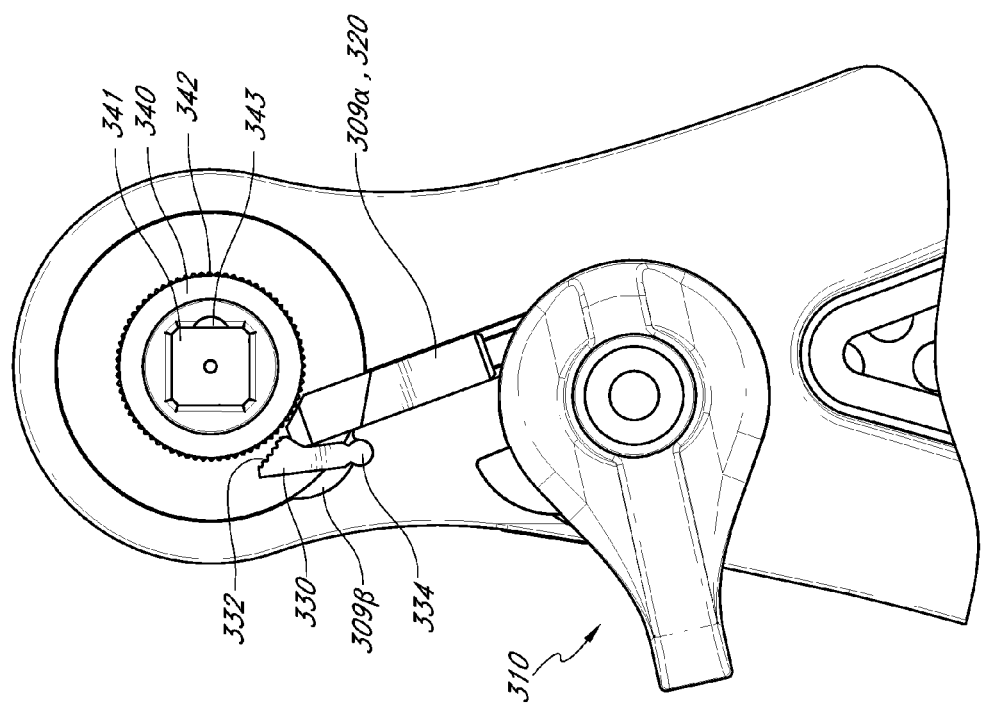
FIG. 5B is a right-side view of the ratchet lock assembly of FIG. 5A with a right side cradle member, a clutch mechanism, and additional associated components hidden.
Figure 5C:
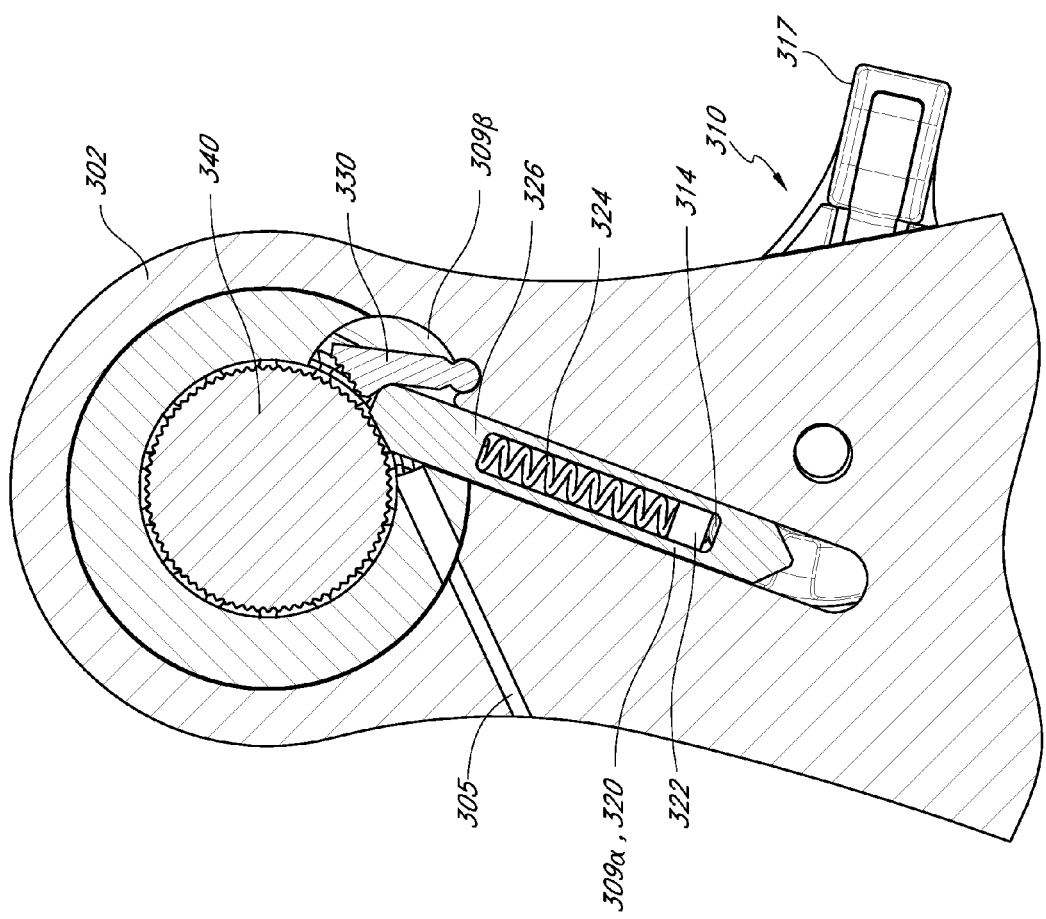
FIG. 5C is cross-section view of the ratchet lock assembly of FIG. 5A along cut plane A-A from FIG. 4.

In some embodiments, the ratchet lock 308 comprises a ratchet gear 340, an engagement member 330, an engagement release member 320 and an actuator 310, as best depicted in FIG. 5A-5C. The actuator 310 can comprise a handle 317, a force translation member 314 and a protrusion 313. Movement of the handle 317 of the actuator 310 and translation member 314 can cause the release member 320 to slide back and forth within a channel 309α in the lower support assembly 302. In some embodiments, the actuator 310 and release member 320 can be a unitary part. When moved, the release member 320 can come into contact with the engagement member 330 and move the engagement member 330 toward or away from the ratchet gear 340. In this way, the engagement member 330 can be engaged or disengaged from the ratchet gear 340, as will be further described below. In some embodiments, the release member 320 and engagement member 330 can be a unitary part.

The actuator 310 can also include a detent system. For example, the depicted actuator 310 includes a protrusion 313 configured to engage with one or more indentations 307 on the lower support assembly 302. The indentations 307 can be positioned at locations of significance such as where the engagement member 330 is engaged with or disengaged from the ratchet gear 340, as discussed further below. Thus, engagement between the protrusion 313 and the indentations 307 can provide the user of the articulated arm CMM with a tactile indication of whether the ratchet lock 308 is engaged or disengaged, in addition to the visual indicator 312. Further, the engagement between the protrusion 313 and the indentations 307 can stabilize the actuator 310 in the associated position. In some embodiments, the protrusion 313 can be spring loaded to bias the protrusion 313 toward the indentations 307.

FIG. 5A illustrates a configuration of an embodiment of the ratchet lock 308 wherein the release member 320 is in contact with the engagement member 330 and thus prevents the engagement member 330 from engaging with the ratchet gear 340. The release member 320 can thus push the engagement member 330 away from the ratchet gear 340. As depicted, the engagement member 330 comprises a hinge-point 334, about which the engagement member 330 can rotate within a cavity 309β of the lower support assembly 302 between positions engaging or not engaging the ratchet gear 340. When engaging the ratchet gear 340, the engagement member can include a plurality of teeth 332 configured to engage with ratchet gear 340. In other embodiments the engagement member 330 can comprise some other engagement means, such as a high friction surface for contacting the ratchet gear 340. In some embodiments, the ratchet gear 340 comprises a plurality of teeth 342 corresponding with the teeth 332 on the engagement member 330 to prevent relative rotation.

The release member 320 can comprise a resilient member 324. The resilient member 324 can be positioned between the actuator 310 and the ratchet gear 340. In some embodiments, the resilient member 324 can comprise a spring. This is illustrated in FIG. 5C, where the cross-section A-A is taken such that an outer portion of the release member 320 is cut-away to show the resilient member 324. In other embodiments, the resilient member 324 could comprise a flexible material within the release member 320, padding on the end of the release member 320 which contacts the engagement member, or some other means of absorbing force between the translation member 314 and the ratchet gear 340 and/or engagement member 330. For example, if a user of the ratchet lock 308 shown in FIG. 5C were to apply a high amount of force to the handle 317 of the actuator 310, the resilient member 324 could help prevent damage to the ratchet gear 340 and/or the engagement member 330 by absorbing some of the force between the translation member 314 and the ratchet gear 340 and/or engagement member 330.

When the engagement member 330 is engaged with the ratchet gear 340, the right cradle support member 306 is inhibited from moving in at least one direction 348 of rotation. Engagement of the ratchet lock 308, therefore, helps to prevent damage to the arm of the CMM from inadvertent movement and/or impact with other objects if the user of the articulated arm CMM pauses in his or her use of the CMM. A hole 305 in the lower support assembly 302 can provide access to the ratchet lock 308 from outside the lower support assembly 302. The hole 305 can make it easier for a user of the machine or a repair technician to access the ratchet lock 308 if it malfunctions by allowing access to the ratchet lock without disassembly of the lower support assembly 302 or the ratchet lock 308.

Figure 6:
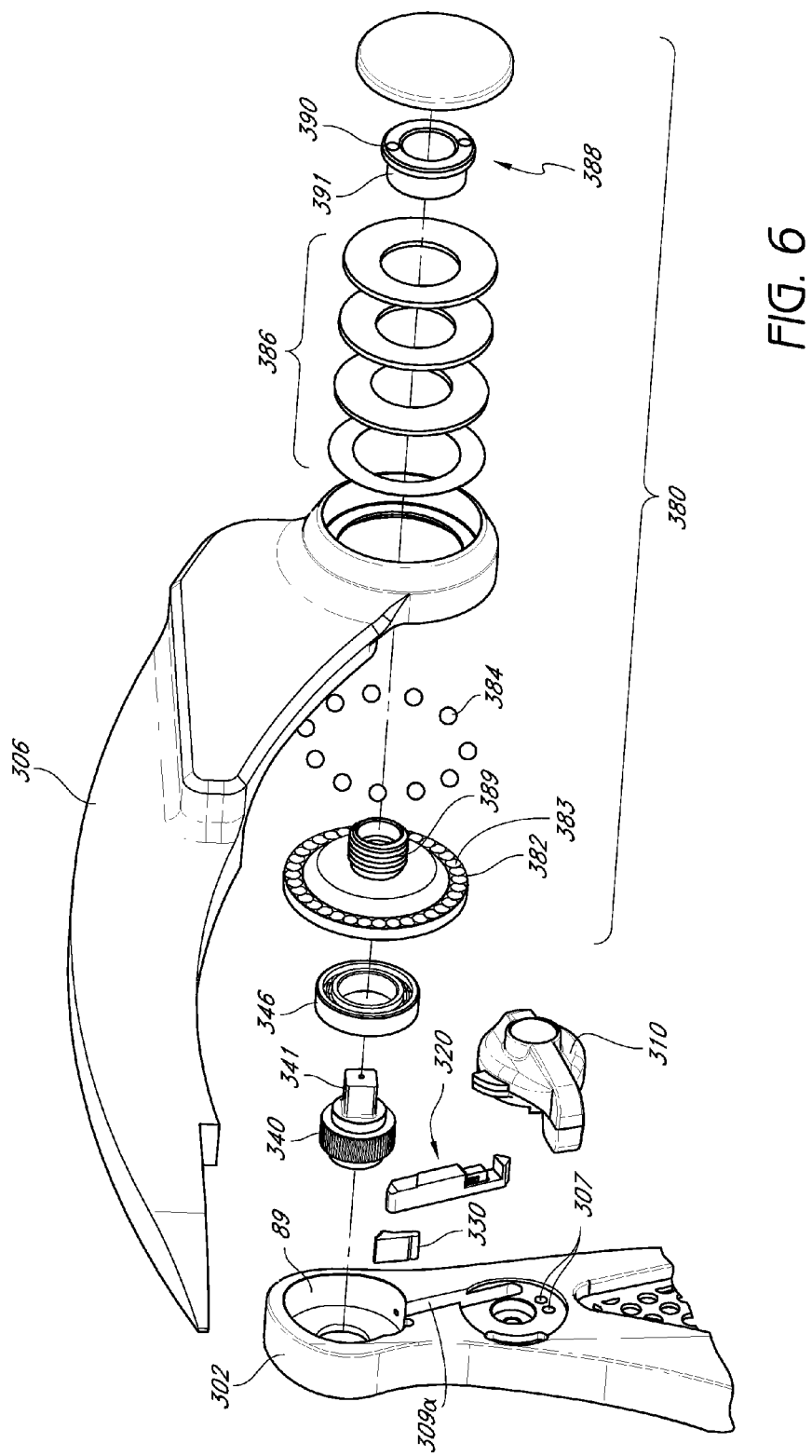
FIG. 6 is an exploded view of a ratchet lock assembly and a clutch mechanism of the counterbalance system of FIG. 4.

The improved counterbalance system 80 of an articulated arm CMM can further comprise a clutch mechanism 380 which can operate in conjunction with the ratchet lock 308. For example, FIG. 6 illustrates an exploded view of a ratchet lock 308 and clutch mechanism 380 configured to engage with the right side cradle member 306 of an articulated arm CMM. The depicted clutch assembly 380 comprises a detent hub 382, torque release members 384, right side cradle member 306, resilient members 386, and a biasing member 388. In some embodiments, the detent hub is constructed from 41CrAlMo7 with a plasma Nitrating Heat Treatment. The detent hub 382 is configured to engage with the ratchet gear 340 in a rotationally fixed configuration. For example, the detent hub 382 can comprise a shaped cavity 381 which can be configured to receive an extension member 341 of the ratchet gear 340. In some embodiments, the cavity 381 and extension member 341 have rectangular, square, triangular, splined, or some other corresponding shapes configured to prevent relative rotation. The extension member 341 can further comprise a protrusion 343 which can correspond to a complementary indentation inside the cavity 381 of the detent hub 382, thus inhibiting movement of the detent hub 382 in relation to the ratchet gear 340 both rotationally and along the axis of rotation of the ratchet gear 340. Thus, the detent hub 382 and the ratchet gear 340 can be configured to be rotationally and axially fixed to each other, such that preventing rotation of the ratchet gear 340 through the ratchet lock 308 can also prevent rotation of the detent hub 382.

In some embodiments, the detent hub 382 can further comprise indentations 383. The indentations 383 can be configured to engage with a plurality of torque release members 384, depicted as a plurality of balls. The right side cradle member 306 can also comprise indentations 385 which face the indentations 383 of the detent hub 382 and can also be configured to engage with the torque release members 384. The torque release members can then simultaneously be disposed in or engage with both sets of indentations 383, 385. Thus, when positioned within the indentations 383 and 385, the torque release members 384 can inhibit relative rotation of the right side cradle member 306 in at least one direction with respect to the detent hub 382.

Figure 7A:
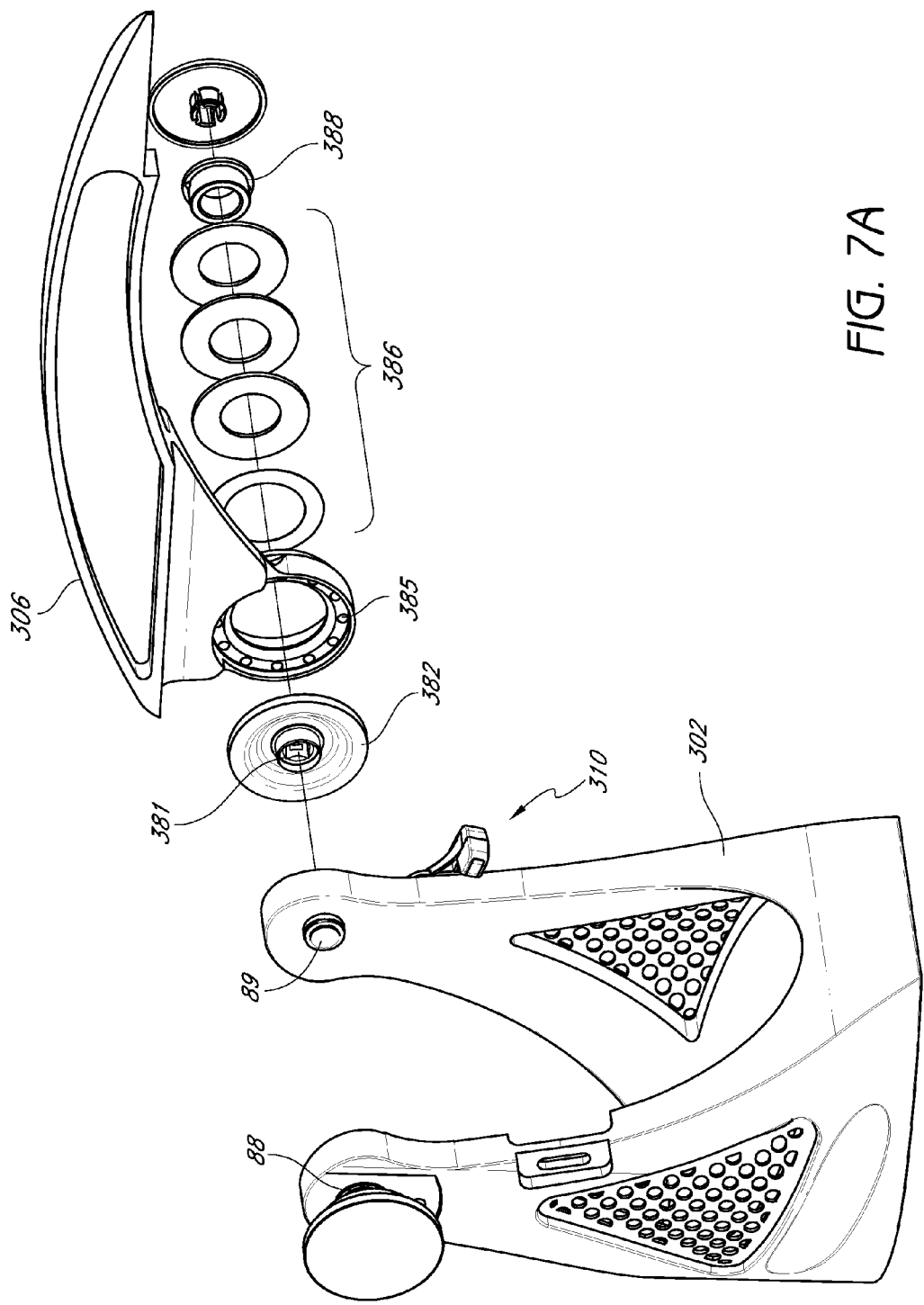
FIG. 7A is an exploded view of the clutch mechanism of the counterbalance system of FIG. 4.
Figure 7B:
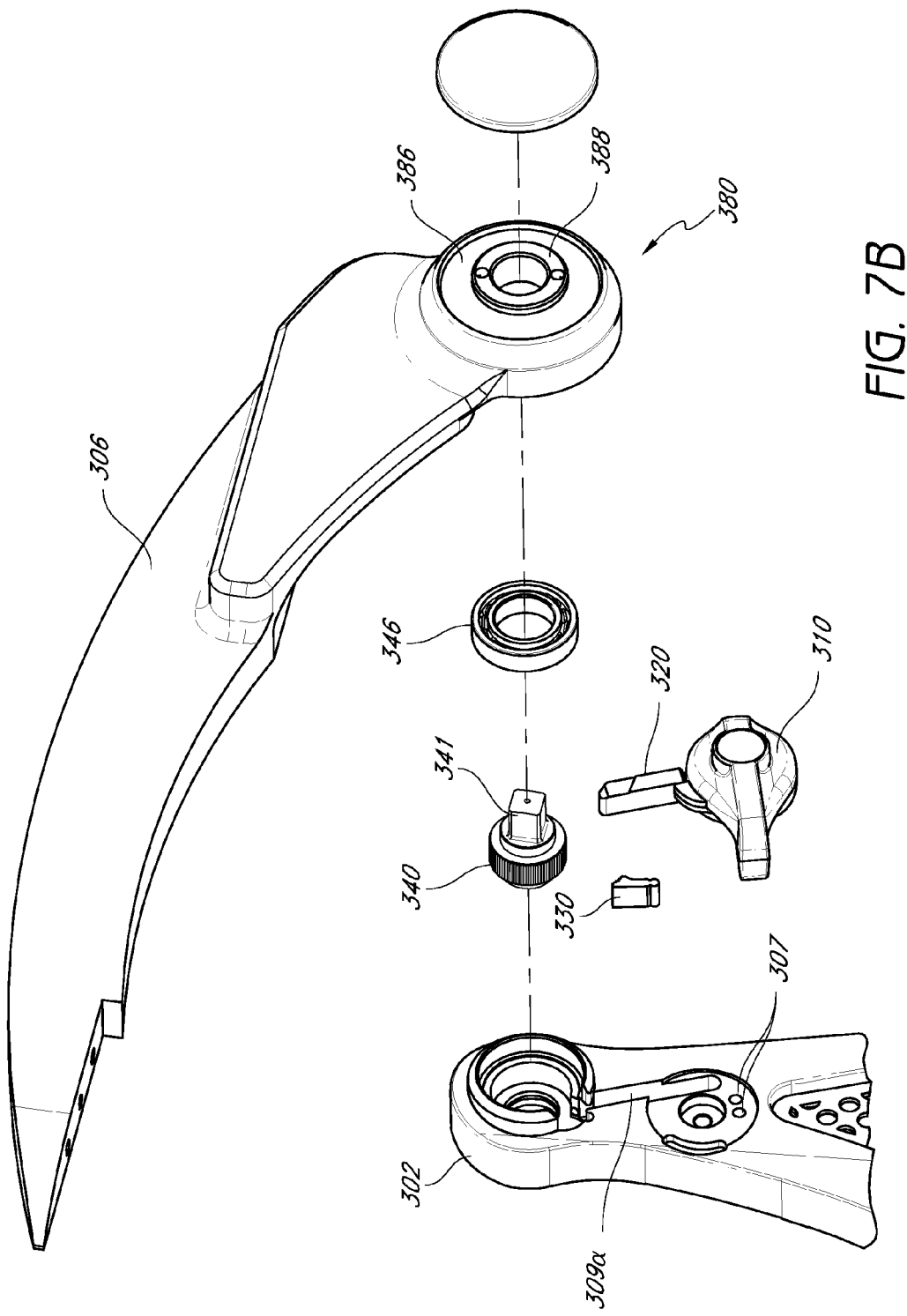
FIG. 7B is an exploded view of the ratchet lock assembly of FIGS. 5A-5C.
Figure 8:
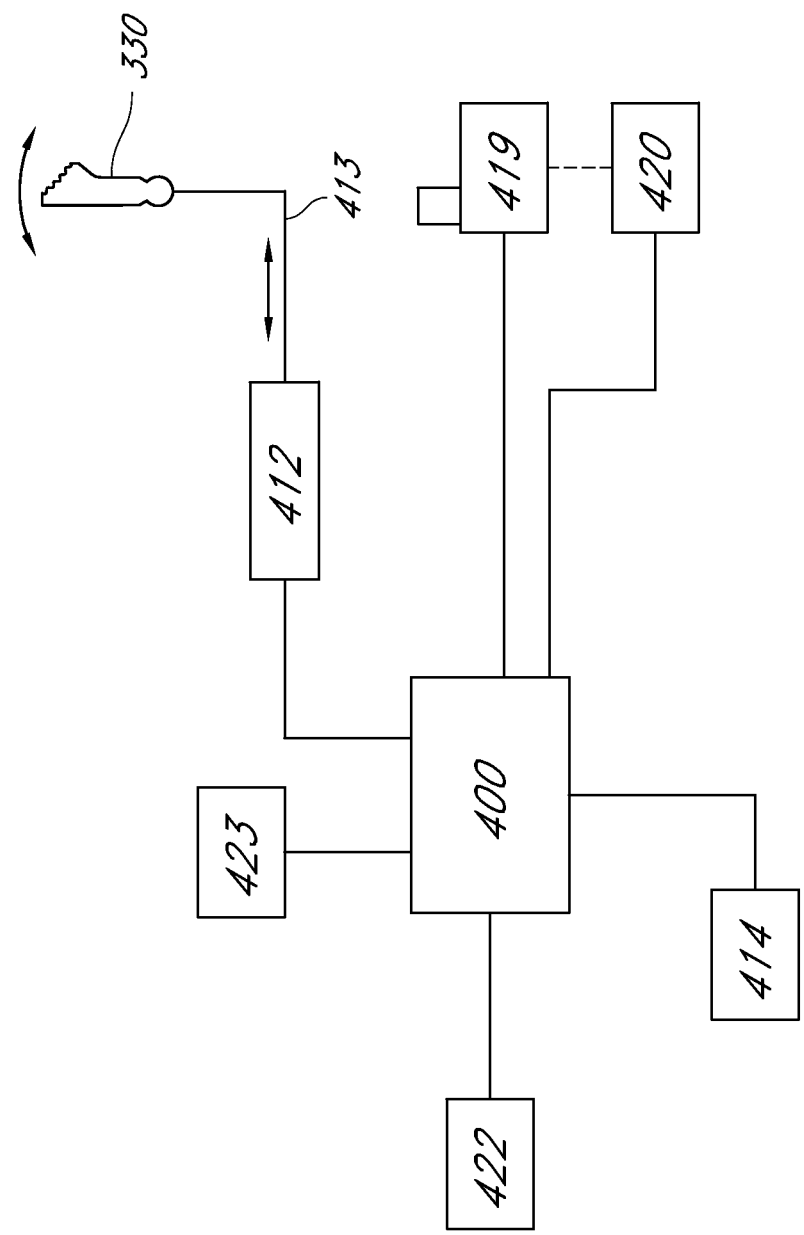
FIG. 8 is a diagram showing a control circuit for the ratchet lock assembly of FIGS. 5A-5C.

Additionally, as best shown in FIGS. 6 and 7A, the right side cradle member 306 and the detent hub 382 can be biased together by the biasing member 388 and the resilient members 386, as further described below. Biasing the right side cradle member 306 toward the detent hub 382 in turn biases the torque release members 384 into the indentations 383 of the detent hub 382 and into the indentations 385 of the right side cradle member 306. As described above, the torque release members 384 can inhibit rotation of the right side cradle member 306 with respect to the detent hub 382 by engaging with the indentations 382, 385.

FIGS. 6 and 7A illustrate an embodiment of the clutch mechanism 380 wherein the resilient members 386 comprises a series of spring washers. In another embodiment, the resilient members could comprise one or more springs or some other resilient member(s) suitable for installation in the clutch mechanism 380. When a torque is applied to the right side cradle member 306 (e.g., about the pivot point 89), that torque can be transferred to the torque release members 384 through contact with the indentations 385. However, because the contact between the torque release members 384 and the indentations 385 can be sloped, for example with a sloped (e.g., spherical, conical, etc.) torque release member 384 in a sloped (e.g., spherical, conical, etc.) indentation 385, this torque can create an axial force pushing the torque release members 384 out of the indentations 385. Further, the torque and axial force applied to the torque release members 384 can be passed to the detent hub 382 through similar contact with the indentations 383. Thus, when the torque release members 384 remain engaged with the indentations 383, 385, torque from the right side cradle member 306 can transfer to the detent hub 382, rotationally fixing these elements.

However, as noted above, the torque about the pivot point 89 can also create an axial force between the torque release members 384 and the indentations 383, 385. This axial force can then push the indentations 383, 385 (and their corresponding pieces) apart. This force can be resisted by a biasing force from the resilient members 386, depicted as Belleville washers. The resilient members 386 can be held against the right side cradle member 306 by a lip 390 on the biasing member 388. The biasing member 388 can further include an extended portion 391 extending away from the lip 390, through openings in the resilient members 386, to the detent hub 382. The extended portion 391 of the biasing member 388 can threadably attach to an extended portion 389 of the detent hub 382 to fix the biasing member 388 axially to the detent hub 382. Thus, the resilient members 386 can push against the biasing member 388 to then push the right side cradle member 306 toward the detent hub 382.

This biasing force in the resilient members can be resisted by the above-described axial force caused when torque is applied on the right side cradle member 306, torque release members 384, and detent hub 382. When the axial force is great enough to overcome the biasing force created by the biasing member 388 and the resilient members 386, the torque release members 384 could move out of either the indentations 383 of the detent hub 382 or the indentations 385 of the right side cradle member 306, depending the tilt of the apparatus at the moment the torque release member 384 are released. In some embodiments, the indentations 383, 385 can be configured such that, regardless of the tilt of the apparatus, the torque release member 384 would move out of only one set of indentations 383 or 385 and would remain in the other set of indentations upon application of a force sufficient to overcome the biasing force. For example, the indentations 383 of the detent hub 382 can be shallower and more sloped than the indentations 385 of the right side cradle member 306, thus hindering the torque release members 384 from moving out of the indentations 385 when the torque release members 384 are released. In other embodiments one set of indentations can have a magnetic material that interacts with the torque release members to hinder the torque release members 384 from moving out of said indentations. The release of the torque release members 384 allows for rotation of the right side cradle member 306 with respect to the detent hub 382 and ratchet gear 340. The torque release members can then move back into either the indentations 383 of the detent hub 382 or the indentations 385 of the right side cradle support 306 and prevent the right side cradle support 306 from rotating further with respect to the lower support assembly 302. By allowing limited movement of the right side cradle support member 306, the clutch mechanism 380 helps prevent damage to the arm, such as bending of the arm or breaking of the ratchet lock 380, when a high degree of force is applied to the right side cradle member 306 while the ratchet lock 308 is engaged.

Additionally, reengagement of the torque release member 384 into the indentations 383 of the detent hub 382 prevents the rights side cradle support member 306 from continuing to move when the high degree of force is no longer applied. This reengagement of the torque release members 384 helps prevent damage to the articulated arm supported by the cradle support members from inadvertently impact with the ground or some other object. The torque release member 384 can comprise spheres, ellipsoids, cylinders, pyramids, cones or any other shapes with sloped edges, and the corresponding indentations 383, 385 can have a similar variation of shapes. Other embodiments of the clutch mechanism 380 could comprise a pair of face gears instead of or in addition to indentations 383, 385 and torque release members 384. Additionally or alternatively, the clutch mechanism 380 could comprise a friction ring interposed between the ratchet gear 340 and the axle on which the ratchet gear 340 is mounted.

In some embodiments, the actuator 310 can also or alternatively comprise an electromechanical actuator 412 connected to the engagement member 330 via a mechanical transmission chain 413. The mechanical transmission chain 413 can facilitate transition of the engagement member 330 from an engaged to a disengaged state and vice versa. The electromechanical actuator 412 can be a piezoelectric actuator, a solenoid, a stepping motor, a linear actuator or some other electromechanical actuator. The electromechanical actuator 412 can connect to a control unit 400, which can, in turn, connect to a power source 422, such as an AC current from a wall socket, the power supply of the articulated arm CMM, or a battery. A user input control unit 414 can be installed anywhere on the articulated arm CMM, including but not limited to the distal end of the articulated arm. For example, the input control unit 414 could be installed on a handle 40 of the articulated arm or at another location near an end of the arm. In further embodiments, the control unit 414 can be on an auxiliary device such as a computer in operable communication with the CMM. The input control unit 414 can be electrically connected to the control unit 400 via a wired or wireless connection. The control unit 414 can comprise a capacitive input, a push button, a switch or any other user-input means known in the art. A user of the CMM can use the control unit 414 to engage and/or disengage the ratchet lock 308.

A force sensor 419 can be mounted on the surface of the cradle 82 nearest the transfer member 20 housed in the cradle 82. The force sensor 419 can be used to detect a bending of the cradle member 82, a bending of the transfer member 20 and/or to measure a variation in the distance between the cradle member 82 and the transfer member 20 housed in the cradle member 82. The force sensor 419 can be connected to an alarm element 420. The alarm element 420 can be, for example, a warning light or display, a sound alarm or a vibrating element mounted on the distal end of the articulated arm. The force sensor 419, or another sensor 423 can be connected to the clutch mechanism 380 and the clutch mechanism 380 can be arranged to cause the ratchet lock 308 to engage. This sensor 423 and/or the encoders 37 can be configured to detect the upper resting position of the articulated arm and cause the ratchet lock 308 to engage when the arm reaches its upper resting position and/or enters into sleep mode, as illustrated in FIG. 1 and described below. Additionally or alternatively, the sensor 423, encoders 37 and/or additional sensors can be used to detect a substantially fixed position of the articulated arm during a predetermined time period and can cause the ratchet lock 308 to engage automatically in order to relieve the operator of the articulated arm. In some embodiments, the encoders 37 and control unit 400 can be programmed to cause the ratchet lock 308 to engage upon a sudden and/or swift movement of the CMM arm 1. This can help prevent damage to the CMM arm 1 in the event it begins to fall toward the floor or toward another object. The control unit 400 is generally known in the art and can comprise, for example, a processor programmed to facilitate the functions described above. It should be appreciated the improved counterbalance systems 80 described above can be used in other types of CMMs and need not be used in combination with the additional embodiments described above and below the preceding section.

Figure 9:
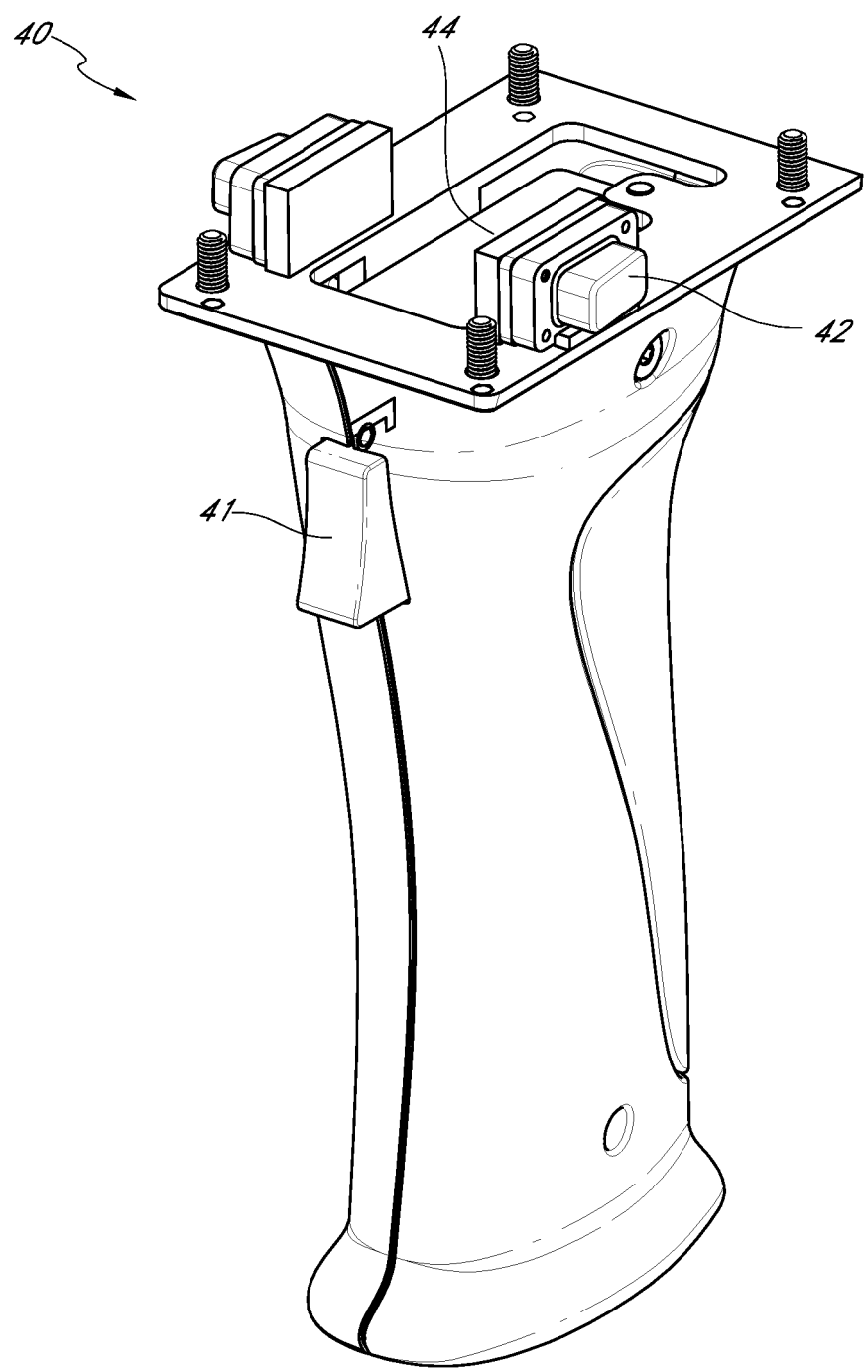
FIG. 9 is a perspective view of a handle of the articulated arm of FIG. 1.

FIG. 9 depicts an improved handle 40. The handle 40 can include one or more integrated buttons 41. The handle can connect to the axis with bolts, snaps, or clamps. Additionally, the handle 40 can include electronics 44 included within its interior. Advantageously, providing the electronics 44 in the handle 40 can further separate the electronics from rotational encoders and other components that may lose accuracy when heated. In some embodiments the handle 40, or the electronics 44 therein, can be thermally isolated from the remainder of the arm. Additionally, when the handle 40 is removable and includes the electronics 44, it can form a modular component similar to the feature packs (described below). Thus, a user can change the functionality by changing the handle 40, and accordingly also changing the electronics 44 and the buttons 41 that control the electronics. A plurality of handles 40 with different functionalities can thus be provided in a CMM system to provide modular features to the CMM. Again, it should be noted that in other embodiments of the inventions described herein, a different handle can be used, or alternatively there can be no distinct handle. Additionally, the handle can contain a battery to power the arm, the scanner or both.

Figure 10:
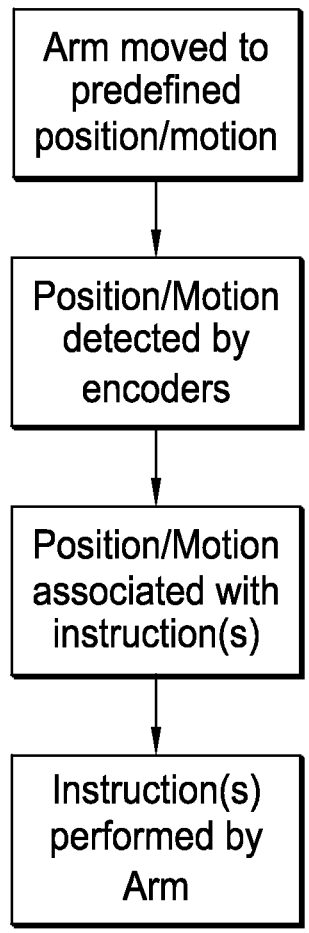
FIG. 10 is a flow diagram of a method of operating an articulated arm.

It should be appreciated the improved handle 40 described above can be used in other types of CMMs and need not be used in combination with the additional embodiments described above and below the preceding section Additionally or alternatively, in some embodiments a CMM arm 1 can be at least partially controlled by motion of the arm itself, as depicted in FIG. 10. For example, whereas some commands or instructions may be triggered by the pressing of a button, pulling a lever, turning a dial, or actuating some other traditional actuation device in some embodiments, in other embodiments the same or different instruction can be triggered by a specific motion or position of the CMM arm 1, which can be detected by the encoders 37. As a more specific example, in some embodiments the CMM arm 1 can be instructed to enter a sleep mode when the arm is placed in a generally folded or retracted position, such as that depicted in FIG. 1. The CMM arm 1 can then perform that instruction. Similarly, the CMM arm 1 can be reawakened by a rapid movement, or movement into a more extended position. Other combinations of instructions, motions, and positions are possible.

For example, in some embodiments the CMM arm 1 can enter into different data acquisition modes depending on its general orientation. Varying the data acquisition mode by position can be advantageous where the CMM arm 1 regularly measures products that require different data acquisition modes along different parts of a product.

Further, in some embodiments the arm can enter into different data acquisition modes depending on its speed of movement. For example, an operator of the CMM may move the CMM slowly when a critical point will soon be measured. Thus, the CMM can increase its measurement frequency, accuracy, or other characteristics when the arm is moving slowly. Additionally, the CMM can be toggled between a mode where the arm is used as a computer mouse and a measurement mode with a quick movement of one of the last axes (embodiments of an associated computer further described below).

As with the previous embodiments, it should be appreciated that these features related to control of the arm can be used in other types of CMMs and need not be used in combination with the additional embodiments described above and below the preceding section.

The various devices, methods, procedures, and techniques described above provide a number of ways to carry out the invention. Of course, it is to be understood that not necessarily all objectives or advantages described may be achieved in accordance with any particular embodiment described herein. Also, although the invention has been disclosed in the context of certain embodiments and examples, it will be understood by those skilled in the art that the invention extends beyond the specifically disclosed embodiments to other alternative embodiments and/or uses and obvious modifications and equivalents thereof. Accordingly, the invention is not intended to be limited by the specific disclosures of preferred embodiments herein.

What is claimed is:

1. An articulated arm CMM comprising:
an articulated arm comprising a plurality of transfer members, a plurality of articulation members connecting at least two transfer members to each other, a coordinate acquisition member at a distal end, and a lower support assembly at a proximal end; and
a releasable locking system mounted about one or more of the transfer members to affect a rotation of one or more of the transfer members, the releasable locking system comprising:
 a cradle member comprising a pivot and being configured to support a rotation of at least one transfer member, the cradle member further comprising one or more indentations configured to receive one or more balls;
 a detent hub rotatably mounted to the cradle member and comprising one or more indentations configured to receive one or more balls;
 one or more balls disposed between the cradle member and the detent hub, wherein the balls can reversibly be disposed within the indentations of both the cradle member and the detent hub to rotationally fix the cradle member relative to the detent hub;
 a resilient member biasing the cradle member toward the detent hub to bias the one or more balls into the indentations of both the cradle member and the detent hub to rotationally fix the cradle member relative to the detent hub, such that the one or more balls can also be released from the indentations and allow relative rotation between the cradle member and the detent hub when a torque sufficient to overcome the resilient member is provided;
 a ratchet gear rotationally fixed to the detent hub and comprising a plurality of teeth;
 a ratchet locking member configured to reversibly engage the teeth of said ratchet gear in a ratcheting relationship and biased toward engagement with said teeth; and
 a lock release member movable between a first position to a second position, wherein the lock release member prevents engagement between the ratchet locking member and the ratchet gear in the first position and does not prevent said engagement in the second position, such that the ratcheting relationship affects the one or more transfer members when the lock release member is in the first position but does not when in the second position, and further such that the ratcheting relationship does not affect the one or more transfer members when a torque sufficient to overcome the resilient member is provided.

2. An articulated arm CMM comprising:
an articulated arm comprising one or more articulated arm members, a coordinate acquisition member at a distal end, and a lower support assembly at a proximal end; and
an arm support member mounted about the articulated arm CMM to support one or more articulated arm members during rotation, the arm support member comprising:
 a gear comprising circumferential teeth,
 an engagement member configured to reversibly engage the circumferential teeth of said gear to prevent rotation of the gear relative to the engagement member in at least a first direction of rotation, and
 a release member movable between a first position and a second position, wherein the release member prevents the reversible engagement between the engagement member and the gear when in the first position and does not prevent said reversible engagement when in the second position, such that the arm support member hinders rotation of the one or more articulated arm members when the lock release member is in the second position but does not when the lock release member is in the first position.

3. The articulated arm CMM of claim 2, wherein the arm support member further comprises an actuator wherein the actuator is configured to receive an input to move the release member between the first position and the second position.

4. The articulated arm CMM of claim 3, wherein the actuator comprises an electromechanical actuator.

5. The articulated arm CMM of claim 4, wherein the articulated arm CMM further comprises an input control unit in communication with the electromechanical actuator.

6. The articulated arm CMM of claim 5, wherein the input control unit is in wireless electrical communication with the electromechanical actuator.

7. The articulated arm CMM of claim 5, wherein the input control unit is disposed near the distal end of the articulated arm.

8. The articulated arm CMM of claim 5, wherein the input control unit comprises one or more of the following: a switch, a button, and a capacitive input.

9. The articulated arm CMM of claim 2, wherein the release member further comprises a first end, a second end, and a resilient member wherein:
said first end is configured to engage said engagement member when the release member is in the first position,
said second end is configured to engage with an actuator, and
said resilient member is located between the first end and the second end of said release member, the resilient member configured to, when said release member is moved toward the gear, absorb force between said first and second ends.

10. The articulated arm CMM of claim 9, wherein the resilient member comprises a spring.

11. The articulated arm CMM of claim 2, wherein the gear is rotationally fixed to a detent hub.

12. The articulated arm CMM of claim 11, wherein the gear and the detent hub are a unitary component.

13. The articulated arm CMM of claim 2, wherein the CMM further comprises an indicator, wherein the indicator indicates whether the release member is in the first position or the second position.

14. The articulated arm CMM of claim 2, wherein the engagement member and the release member are a unitary component.

15. The articulated arm CMM of claim 2, wherein the arm support member further comprises a sensor for detecting bending of the arm support member.

16. The articulated arm CMM of claim 15, wherein the CMM further comprises an alarm in electrical communication with said sensor, said alarm configured to alert a user when the arm support member is subject to bending.

17. The articulated arm CMM of claim 15, wherein the CMM further comprises an electromechanical actuator connected to the ratchet lock via a mechanical transmission chain, said electromechanical actuator also in electrical communication with said sensor such that said electromechanical actuator can engage or disengage said ratchet lock upon signal from said sensor.

18. The articulated arm CMM of claim 3, wherein the actuator comprises a detent mechanism in cooperation with the lower support assembly wherein the detent mechanism can provide a user of the articulated arm CMM with at least one of a tactile, audible, and visual indicator when the release member is in a first position or a second position.

19. An articulated arm CMM comprising:
an articulated arm comprising a plurality of transfer members, a plurality of articulation members connecting at least two transfer members to each other, a coordinate acquisition member at a distal end, and a lower support assembly at a proximal end; and
a releasable locking system mounted about the articulated arm CMM to support one or more of the transfer members during rotation, the releasable locking system comprising:
a cradle support member comprising a pivot and being configured to support at least one transfer member during rotation, the cradle support member further comprising one or more surface engagement features,
a detent hub rotatably mounted to the cradle support member and comprising one or more surface engagement features configured to reversibly engage with the one or more surface engagement features of the cradle support member, the detent hub configured to be rotationally fixed to a portion of the lower support assembly, and
a resilient member biasing the cradle support member toward the detent hub such that the one or more surface engagement features of the cradle support member engage with the one or more surface engagement features of the detent hub to rotationally fix the cradle support member relative to the detent hub, such that the one or more surface engagement features of the cradle support member can also be released from the one or more surface engagement features of the detent hub and allow relative rotation between the cradle support member and the detent hub when a torque sufficient to overcome the resilient member is provided.

20. The articulated arm CMM of claim 19, wherein the resilient member comprises spring washers.

21. The articulated arm CMM of claim 19, wherein the resilient member comprises a spring.

22. The articulated arm CMM of claim 19, wherein:
the surface engagement features of the cradle support member comprise one or more indentations and one or more torque release members,
the surface engagement features of the detent hub comprise one or more indentations, and
wherein said torque release members are biased into the indentations of both the cradle support member and the detent hub to rotationally fix the cradle support member to the detent hub, such that the one or more torque release members can also be released from the indentations and allow relative rotation between the cradle support member and the detent hub when a torque sufficient to overcome the resilient member is provided.

23. The articulated arm CMM of claim 22, wherein the torque release members comprise spherical balls.

24. The articulated arm CMM of claim 22, wherein the torque release members are configured to release from the indentations of only one of the detent hub or cradle support member.

25. The articulated arm CMM of claim 19, wherein the detent hub is rotationally fixed to a ratchet gear.

26. The articulated arm CMM of claim 25, wherein the detent hub and ratchet gear are a unitary component.

27. The articulated arm CMM of claim 25, wherein the ratchet gear can be associated with an engagement member, the engagement member being movable between a first position engaged with the ratchet gear to form a ratcheting relationship and a second position unengaged with the ratchet gear.

28. An articulated arm CMM comprising:
an articulated arm comprising one or more articulated arm members, a coordinate acquisition member at a distal end, and a lower support assembly at a proximal end; and
an arm support member mounted about the articulated arm CMM to support one or more articulated arm members during rotation, the arm support member comprising a ratchet mechanism and an actuator,
wherein the actuator is configured to receive input to transfer said ratchet mechanism between an engaged and disengaged state, the ratchet mechanism configured to hinder the rotation of the one or more articulated arm members when said ratchet mechanism is in an engaged state.

29. The articulated arm CMM of claim 28, wherein the ratchet mechanism comprises:
a gear comprising circumferential teeth,
an engagement configured to reversibly engage the circumferential teeth of said gear to prevent rotation of the gear relative to the locking member in at least a first direction of rotation, and
a release member movable between a first position and a second position, wherein the release member prevents the reversible engagement between the locking member and the gear when in the first position and does not prevent said reversible engagement when in the second position, such that the arm support member hinders the rotation of the one or more articulated arm members when the lock release member is in the second position but does not when in the first position.

30. The articulated arm CMM of claim 28 or 29, wherein the actuator comprises an electromechanical actuator.

31. The articulated arm CMM of claim 30, wherein the articulated arm CMM further comprises an input control unit in communication with the actuator.

32. The articulated arm CMM of claim 31, wherein the input control unit is in wireless electrical communication with the electromechanical actuator.

33. The articulated arm CMM of claim 31, wherein the input control unit is disposed near the distal end of the articulated arm.

34. The articulated arm CMM of claim 31, wherein the input control unit comprises one or more of the following: a switch, a button, a capacitive input.

35. The articulated arm CMM of claim 29, wherein the release member further comprises a first end, a second end, and a resilient member wherein:
said first end is configured to engage said engagement member when the release member is in the first position,
said second end is configured to engage with an actuator, and
said resilient member is located between the first end and the second end of said release member, the resilient member configured to, when said release member is moved toward the gear, absorb force between said first and second ends.

36. The articulated arm CMM of claim 35, wherein the resilient member comprises a spring.

37. The articulated arm CMM of claim 29, wherein the gear is rotationally fixed to a detent hub.

38. The articulated arm CMM of claim 37, wherein the gear and the detent hub are a unitary component.

39. The articulated arm CMM of claim 28, wherein the CMM further comprises an indicator, wherein the indicator indicates whether the ratcheting mechanism is engaged or disengaged.

40. The articulated arm CMM of claim 29, wherein the engagement member and the release member are a unitary component.

41. The articulated arm CMM of claim 28, wherein the arm support member further comprises a sensor for detecting bending of the arm support member.

42. The articulated arm CMM of claim 41, wherein the CMM further comprises an alarm in electrical communication with said sensor, said alarm configured to alert a user when the arm support member is subject to bending.

43. The articulated arm CMM of claim 41, wherein the CMM further comprises an electromechanical actuator connected to the ratchet lock via a mechanical transmission chain, said electromechanical actuator also in electrical communication with said sensor such that said electromechanical actuator can engage or disengage said ratchet lock upon signal from said sensor.

44. The articulated arm CMM of claim 28, wherein the actuator comprises a detent mechanism in cooperation with the lower support assembly wherein the detent mechanism can provide a user of the articulated arm CMM with at least one of a tactile, audible, and visual indicator when the locking mechanism is in an engaged or disengaged state.

45. An articulated arm CMM comprising:
an articulated arm comprising a plurality of transfer members, a plurality of articulation members connecting at least two transfer members to each other, a coordinate acquisition member at a distal end, and a lower support assembly at a proximal end; and
a releasable locking system mounted about the articulated arm CMM to support one or more of the transfer members during rotation, the releasable locking system comprising a lock device and a release device, wherein said lock device is configured to prevent relative rotation in at least one direction between said one or more transfer members and the lower support assembly and said release device is configured to release the lock device upon the application of a heavy load upon the one or more transfer members.

46. The articulated arm CMM of claim 45, wherein the releasable locking system comprises:
a cradle support member comprising a pivot and being configured to support at least one transfer member during rotation, the cradle support member further comprising one or more surface engagement features,
a detent hub rotatably mounted to the cradle support member and comprising one or more surface engagement features configured to reversibly engage with the one or more surface engagement features of the cradle support member, the detent hub configured to be rotationally fixed to a portion of the lower support assembly, and
a resilient member biasing the cradle support member toward the detent hub such that the one or more surface engagement features of the cradle support member engage with the one or more surface engagement features of the detent hub to rotationally fix the cradle support member relative to the detent hub, such that the one or more surface engagement features of the cradle support member can also be released from the one or more surface engagement features of the detent hub and allow relative rotation between the cradle support member and the detent hub when a torque sufficient to overcome the resilient member is provided.

47. The articulated arm CMM of claim 46, wherein the resilient member comprises spring washers.

48. The articulated arm CMM of claim 46, wherein the resilient member comprises a spring.

49. The articulated arm CMM of claim 46, wherein:
the surface engagement features of the cradle support member comprise one or more indentations and one or more torque release members,
the surface engagement features of the detent hub comprise one or more indentation, and
wherein said torque release members are biased into the indentations of both the cradle support member and the detent hub to rotationally fix the cradle support member to the detent hub, such that the one or more torque release members can also be released from the indentations and allow relative rotation between the cradle support member and the detent hub when a torque sufficient to overcome the resilient member is provided.

50. The articulated arm CMM of claim 48, wherein the torque release members comprise spherical balls.

51. The articulated arm CMM of claim 49, wherein the torque release members are configured to release from the indentations of only one of the detent hub or cradle support member.

52. The articulated arm CMM of claim 46, wherein the detent hub is rotationally fixed to a ratchet gear.

53. The articulated arm CMM of claim 52, wherein the detent hub and ratchet gear are a unitary component.

\* \* \* \* \*